United States Patent
Moritz et al.

(10) Patent No.: US 11,756,551 B2
(45) Date of Patent: Sep. 12, 2023

(54) SYSTEM AND METHOD FOR PRODUCING METADATA OF AN AUDIO SIGNAL

(71) Applicant: Mitsubishi Electric Research Laboratories, Inc., Cambridge, MA (US)

(72) Inventors: Niko Moritz, Allston, MA (US); Gordon Wichern, Boston, MA (US); Takaaki Hori, Lexington, MA (US); Jonathan Le Roux, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 273 days.

(21) Appl. No.: 17/064,986

(22) Filed: Oct. 7, 2020

(65) Prior Publication Data

US 2022/0108698 A1   Apr. 7, 2022

(51) Int. Cl.
*G10L 15/26* (2006.01)
*G10L 15/16* (2006.01)

(52) U.S. Cl.
CPC .............. *G10L 15/26* (2013.01); *G10L 15/16* (2013.01)

(58) Field of Classification Search
CPC .......... G10L 15/00; G10L 15/16; G10L 15/26
See application file for complete search history.

(56) References Cited

U.S. PATENT DOCUMENTS

| | | | |
|---|---|---|---|
| 11,302,329 B1 * | 4/2022 | Sun | G10L 25/51 |
| 2017/0110120 A1 | 4/2017 | Yu et al. | |
| 2017/0323653 A1 * | 11/2017 | Hassan al Banna | G10L 21/0216 |
| 2017/0328983 A1 * | 11/2017 | Volgyesi | G01S 5/28 |
| 2021/0117780 A1 * | 4/2021 | Malik | G06F 16/9536 |
| 2021/0358497 A1 * | 11/2021 | Sun | G10L 15/16 |
| 2022/0108688 A1 * | 4/2022 | Wang | G10L 15/065 |

OTHER PUBLICATIONS

E. çakir, G. Parascandolo, T. Heittola, H. Huttunen and T. Virtanen, "Convolutional Recurrent Neural Networks for Polyphonic Sound Event Detection," in IEEE/ACM Transactions on Audio, Speech, and Language Processing, vol. 25, No. 6, pp. 1291-1303, Jun. 2017, doi: 10.1109/TASLP.2017.2690575 (Year: 2017).*

H. Miao, G. Cheng, C. Gao, P. Zhang and Y. Yan, "Transformer-Based Online CTC/Attention End-To-End Speech Recognition Architecture," ICASSP 2020—2020 IEEE International Conference on Acoustics, Speech and Signal Processing (ICASSP), Apr. 9, 2020, pp. 6084-6088, doi: 10.1109/ICASSP40776.2020.9053165 (Year: 2020).*

H. Fujimura, M. Nagao and T. Masuko, "Simultaneous Speech Recognition and Acoustic Event Detection Using an LSTM-CTC Acoustic Model and a WFST Decoder," 2018 IEEE International Conference on Acoustics, Speech and Signal Processing (ICASSP ), 2018, pp. 5834-5838, doi: 10.1109/ICASSP.2018.8461916. (Year: 2018).*

Sakti et al. "Deep Bottleneck Fratures and Sound Dependent I vectors for Simultaneous Recognition of Speech and Environmental Sounds." 2016 IEEE Spoken Language Technology Workshop. Dec. 13, 2016 pp. 35-42.

Imoto et al., "Joint Anaysis of Acoustic Event and Scene Based on Multitask Learning," ARXIV.Org Cornell University Library, 201 Olin Library Cornell Univ. Ithaca, NY, Apr. 27, 2019.

* cited by examiner

*Primary Examiner* — Paras D Shah
*Assistant Examiner* — Sean E Serraguard
(74) *Attorney, Agent, or Firm* — Gennadiy Vinokur; Hironori Tsukamoto

(57) ABSTRACT

An audio processing system is provided. The audio processing system comprises an input interface configured to accept an audio signal. Further, the audio processing system comprises a memory configured to store a neural network trained to determine different types of attributes of multiple concurrent audio events of different origins, wherein the types of attributes include time-dependent and time-agnostic attributes of speech and non-speech audio events. Further, the audio processing system comprises a processor configured to process the audio signal with the neural network to produce metadata of the audio signal, the metadata including one or multiple attributes of one or multiple audio events in the audio signal.

19 Claims, 15 Drawing Sheets

SYSTEM AND METHOD FOR PRODUCING METADATA OF AN AUDIO SIGNAL

TECHNICAL FIELD

The present disclosure relates generally to audio processing and more particularly to a system for producing metadata of an audio signal, using a neural network.

BACKGROUND

Speech recognition systems have progressed to a point where humans can interact with computing devices relying on speech. Such systems employ techniques to identify words spoken by a user based on the various parameters of a received audio input. Speech recognition combined with natural language understanding processing techniques enable speech-based user control of a computing device to perform tasks based on user's spoken commands. The combination of the speech recognition and the natural language understanding processing techniques is commonly referred to as speech processing. The speech processing may also convert a user's speech into text data, which may then be provided to various text-based software applications. The conversion of audio data associated with the speech into text representative of that speech is referred to as automatic speech recognition (ASR).

Further, acoustic event detection (AED) techniques can be used to detect certain sound events, such as regular household sounds (a door closing, a sink running, etc.), speech sounds (but not the speech transcription), machinery sounds, or other sound events, with corresponding timing information such that each sound event is associated with an activity start and end time. For example, in an auto repair workshop, the AED can be configured to detect the sound of a drill from an audio input and the corresponding start and end times of the drill sound. Additionally, audio tagging (AT) techniques may be used to detect the presence of a sound event, such as an event with the identification label of "DRILL", irrespective of the timing such that start and end times are not detected. Additionally, or alternatively, AT can include audio captioning, where a natural language sentence is generated describing the acoustic scene. For example, in the auto repair workshop, an audio caption such as "a person is operating the drill while talking" can be generated.

However, the audio tagging (AT), the acoustic event detection (AED), and the automatic speech recognition (ASR) are treated as separate problems. Also, task-specific neural network architectures are used for performing each of the ASR, AED, and AT tasks. Some approaches use attention-based encoder-decoder neural network architectures, where an encoder extracts acoustic cues, attention mechanism acts as a relay, and a decoder performs perception, detecting and recognizing audio events. However, for event classification, use of the encoder-decoder neural network architectures is limited to non-attention based recurrent neural network (RNN) solutions, where the encoder compresses an acoustic signal to a single embedding vector and the decoder detects the audio events encoded in such a vector representation.

Accordingly, there is a need for a system and a method for unifying ASR, AED, and AT.

SUMMARY

It is an object of some embodiments to achieve synergy in performing different transcription tasks on an audio signal of an audio scene, by jointly training a neural network for the different transcription tasks. Alternatively, it is an object of some embodiments to provide a system that is configured to perform, using the neural network, the different transcription tasks such as an automatic speech recognition (ASR), acoustic event detection (AED), and audio tagging (AT) to produce metadata of the audio signal. The metadata includes different types of attributes of multiple concurrent audio events in the audio signal. According to some embodiments, the neural network includes a transformer model and a connectionist temporal classification (CTC) based model and can be trained to perform ASR, AED, and AT transcription tasks on the audio signal. Additionally, it is an object of some embodiments to train the transformer model jointly with the CTC-based model for the ASR and AED tasks. Additionally, or alternatively, it is an object of some embodiments to use attention-based transformer model for the AT task.

Some embodiments aim to analyze the audio scene to recognize, e.g., detect and classify, the audio events forming the audio scene. The detection and classification of the audio events include determining different types of attributes of the audio events carried by the audio signal of the audio scene. The audio signal may carry multiple audio events. Examples of the audio events include speech events including words spoken by a user, non-speech events including various exclamations as well as non-voice sounds, such as regular household sounds (a door closing, a sink running, etc.), sounds of industrial machining, or other sounds. Further, the audio scene can include different types of the audio events occurring concurrently, i.e., overlapping in time, or sequentially, i.e., non-overlapping in time.

The different types of attributes of the audio events define the metadata of the audio events forming the audio scene. In other words, the metadata include the attributes of the audio events in the audio signal. For example, in an auto repair workshop, the audio scene can include sound of a drill, and attribute of the sound of the drill can be identification label of "DRILL." Additionally, or alternatively, the audio scene in the auto repair workshop can include voice commands to a voice-activated diagnostic tool. Hence, the same audio scene can also include a speech event and corresponding attributes can be identification of the speech event as a voice command, transcription of the voice command, and/or identification of a speaker. Additionally, or alternatively, the audio scene in the auto repair workshop can include a conversation between a repairman and a client, and attribute of the conversation can be the transcription of the conversation, i.e., non-command voice utterance. Additionally, or alternatively, an attribute of the audio events can be a natural language sentence describing the scene, such as "a repairman talks to a customer before using a drill".

Accordingly, the attributes of the audio event can be time-dependent, such as automatic speech recognition or acoustic event detection, and/or time-agnostic, such as audio tagging for the identification of the acoustic scene ("auto repair workshop"), an audio caption of the audio scene, or other sound events in the acoustic scene, e.g., the sound of the drill, a speaker, or any other speech/non-speech sounds. Therefore, the audio signal may carry the multiple audio events including the speech events and the non-speech events. The time-dependent attributes include one or combination of the transcription of speech, a translation of the speech, and a detection of an audio event with its temporal position. The time-agnostic attributes include labels or a caption of the audio events. In addition, the attributes can have multiple levels of complexity, such that an audio event can be labeled differently. For example, sound of an engine can be labeled coarsely as engine or machinery noise or in a more detailed way as car engine, bus engine, big engine, small engine, diesel engine, electric engine, accelerating engine, idling engine, rattling engine, and the like, where multiple labels/attributes can be valid simultaneously. Likewise, the speech event can be labeled as speech/no-speech, female/male voice, speaker-ID, singing, screaming, shouting, angry, happy, sad, and the like. Additionally, or alternatively, automatic speech recognition (ASR) transcription can be considered as an attribute of the speech event.

Some embodiments are based on a recognition that complexity of the audio scene can remove boundaries between different transcription tasks, such as automatic speech recognition (ASR), acoustic event detection (AED), and audio tagging (AT). The ASR is a field of artificial intelligence and linguistics concerned with transforming audio data associated with speech into text representative of that speech. The AED involves detection of audio events that include speech and non-speech sounds, such as the regular household sounds, sounds in an auto repair workshop, or other sounds present in the audio scene. In addition, AED involves the detection of temporal positions of such audio events. Further, AT provides label tagging for the audio events, where only the presence of an audio event is detected in an audio signal. Some embodiments are based on a recognition that the ASR, AED, and AT tasks can be performed using a task-specific neural network, respectively. Some embodiments are based on a recognition that such task-specific neural networks can be combined to unify ASR, AED and AT for achieving synergy in performing ASR, AED and AT.

However, in such an approach, training data scarcity problems in individual transcription tasks exist, since such task-specific neural networks cannot leverage the fact that sound events of other tasks can have similar sound event characteristics. Some embodiments are based on a recognition that consideration of the transcription tasks as an estimation of the different types of the attributes of the audio events allows to design a single mechanism aiming to perform transcription tasks on the audio signal of the audio scene, regardless of complexity of the audio scene.

Some embodiments are based on realization that a single neural network can be trained jointly to perform one or more of the transcription tasks. In other words, synergy can be achieved in performing ASR, AED and AT on the audio signal by jointly training a neural network (NN) for the ASR, AED and AT. According to an embodiment, the neural network includes a transformer model and a connectionist temporal classification (CTC) based model, where the CTC-based model shares at least some model parameters with the transformer model. Such a neural network can be used to jointly perform the ASR, AED, and AT, i.e., the neural network can simultaneously transcribe the speech, recognize the audio events occurring in the audio scene, and generate an audio caption for the audio scene. To that end, the audio signal can be processed with the neural network to determine the different types of the attributes of the audio events to produce the metadata of the audio signal. Additionally, using such a neural network (or achieving the synergy) eliminates training data scarcity problems in individual transcription tasks and, also, provides more accurate results. Further, achieving the synergy allows producing customized audio output, i.e., it allows producing desired acoustic information from the audio signal.

According to an embodiment, a model of the neural network shares at least some parameters for determining the time-dependent and the time-agnostic attributes of the speech events and the non-speech audio events. The model of the neural network includes an encoder and a decoder. In an embodiment, the parameters shared for determining the different types of the attributes are parameters of the encoder. In an alternate embodiment, the parameters shared for determining the different types of the attributes are parameters of the decoder. While jointly training the neural network for the transcription tasks, some parameters (such as weights of the neural network) are reused for performing the transcription tasks. Such joint training of the neural network reusing some parameters of the neural network, requires less training data for training each transcription task, allows to use weakly labeled training data, and yields accurate results even with small amounts of the training data in individual tasks.

Some embodiments are based on recognition that the neural network can be configured to selectively perform one or more of the ASR, AED and AT transcription tasks to output a desired attribute of the audio event. According to an embodiment, output of the transformer model depends on an initial state of decoder of the transformer model. In other words, the initial state of the decoder decides whether the decoder will output according to ASR, AT, or AED task. To that end, some embodiments are based on recognition that the initial state of the decoder can be varied based on a desired task to be performed to produce the desired attribute.

Some embodiments are based on realization that a neural network based on a transformer model having encoder-decoder architecture can be used for performing the AED and AT tasks. The neural network based on the encoder-decoder architecture provides decisive advantages. For example, in the AED and AT tasks the decoder of the encoder-decoder architecture directly outputs symbols, i.e., the labels. Therefore, the utilization of the encoder-decoder architecture eliminates a cumbersome process of setting detection thresholds for each class during inference, which is otherwise often used by AED and AT systems. Additionally, the encoder-decoder architecture based neural network does not require a monotonic ordering of the labels, and can thus easily make use of weakly labeled audio recordings (annotated without temporal or sequential information) for training of the neural network. However, temporal information of the audio signal is needed for AED and ASR tasks. Some embodiments are based on a realization that the transformer model can be augmented with a connectionist temporal classification (CTC) based model, where some neural network parameters are shared between both models, to leverage the temporal information of the audio signal. Further, the neural network having the transformer model and the CTC-based model enforces the monotonic ordering and learns a temporal alignment. To that end, the neural network having the transformer model output and the CTC-based model output can be used to jointly perform the ASR, AED, and AT transcription task, for producing the metadata of the audio signal.

According to an embodiment, a model of the neural network includes the transformer model and the CTC-based model. The transformer model includes an encoder and a decoder. The encoder is configured to encode the audio signal and provide encoded audio signal to the decoder. The CTC model-based is configured to process the encoded audio signal of the encoder to produce a CTC output. Since the ASR and AED tasks are temporal information dependent tasks, the transformer model and the CTC-based model are used jointly to perform the ASR and AED tasks. To that end, to perform jointly the ASR and AED tasks, the encoded audio signal is processed with the decoder to execute ASR decoding and AED decoding. Further, the encoded audio signal is processed with the CTC-based model to produce the CTC output. The CTC output is combined with output of the ASR decoding to produce a transcription of the speech events. Similarly, the CTC output is combined with output of the AED decoding to produce the labels for the audio events.

The neural network is further configured to perform the AT task, which is time independent, i.e., temporal information of the audio events is not explicitly determined. For the AT task, the decoder is configured to execute AT decoding. Further, the audio signal is tagged based on the AT decoding. To that end, the neural network can perform both the time dependent (ASR and AED) and time independent tasks (AT).

Some embodiments are based on realization that, to perform the time dependent tasks (ASR and AED), the transformer model is trained jointly with the CTC-based model to leverage the monotonic alignment properties of the CTC. Therefore, the ASR and AED tasks are trained and decoded jointly with the CTC-based model, whereas the AT task is trained only with the transformer model.

In some embodiments the CTC output is further used to compute a temporal position of a detected acoustic event for the AED decoding, e.g., by using a CTC-based forced alignment, such that start and end times of the audio event are estimated.

During the training of the neural network, a weight factor is used to balance loss of the transformer model and loss of the CTC-based model. The weight factors are assigned to training samples of ASR, AED and AT, respectively. According to an embodiment, a multi-objective loss function including the weight factor is used to train the neural network for jointly performing the ASR, AED, and AT tasks. Accordingly, an embodiment discloses an audio processing system. The audio processing system comprises an input interface configured to accept an audio signal. Further, the audio processing system comprises a memory configured to store a neural network trained to determine different types of attributes of multiple concurrent audio events of different origins, wherein the types of attributes include time-dependent and time-agnostic attributes of speech and non-speech audio events, wherein a model of the neural network shares at least some parameters for determining both types of the attributes. Further, the audio processing system comprises a processor configured to process the audio signal with the neural network to produce metadata of the audio signal, the metadata including one or multiple attributes of one or multiple audio events in the audio signal. Furthermore, the audio processing system comprises an output interface configured to output the metadata of the audio signal.

Accordingly, another embodiment discloses an audio processing method. The audio processing method comprising: accepting the audio signal via an input interface; determining, via a neural network, different types of attributes of multiple concurrent audio events of different origins in the audio signal, wherein the different types of attributes include time-dependent and time-agnostic attributes of speech and non-speech audio events, and wherein a model of the neural network shares at least some parameters for determining both types of the attributes; processing, via a processor, the audio signal with the neural network to produce metadata of the audio signal, the metadata including one or multiple attributes of one or multiple audio events in the audio signal; and outputting, via an output interface, the metadata of the audio signal.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Computer audition (CA) or machine listening is a general field of study of algorithms and systems for audio understanding by machine. Since the notion of what it means for a machine to "hear" is very broad and somewhat vague, computer audition attempts to bring together several disciplines that originally dealt with specific problems or had a concrete application in mind.

Making an analogy to computer vision, the computer audition aims to analyse an audio scene to recognize, e.g., detect and classify, audio objects forming the audio scene. In the context of the machine listening, such detection and classification include determining attributes of audio events carried by an audio signal measured by a sensor "lessening to" the audio scene. These attributes define metadata of the audio events forming the audio scene.

Figure 1A:
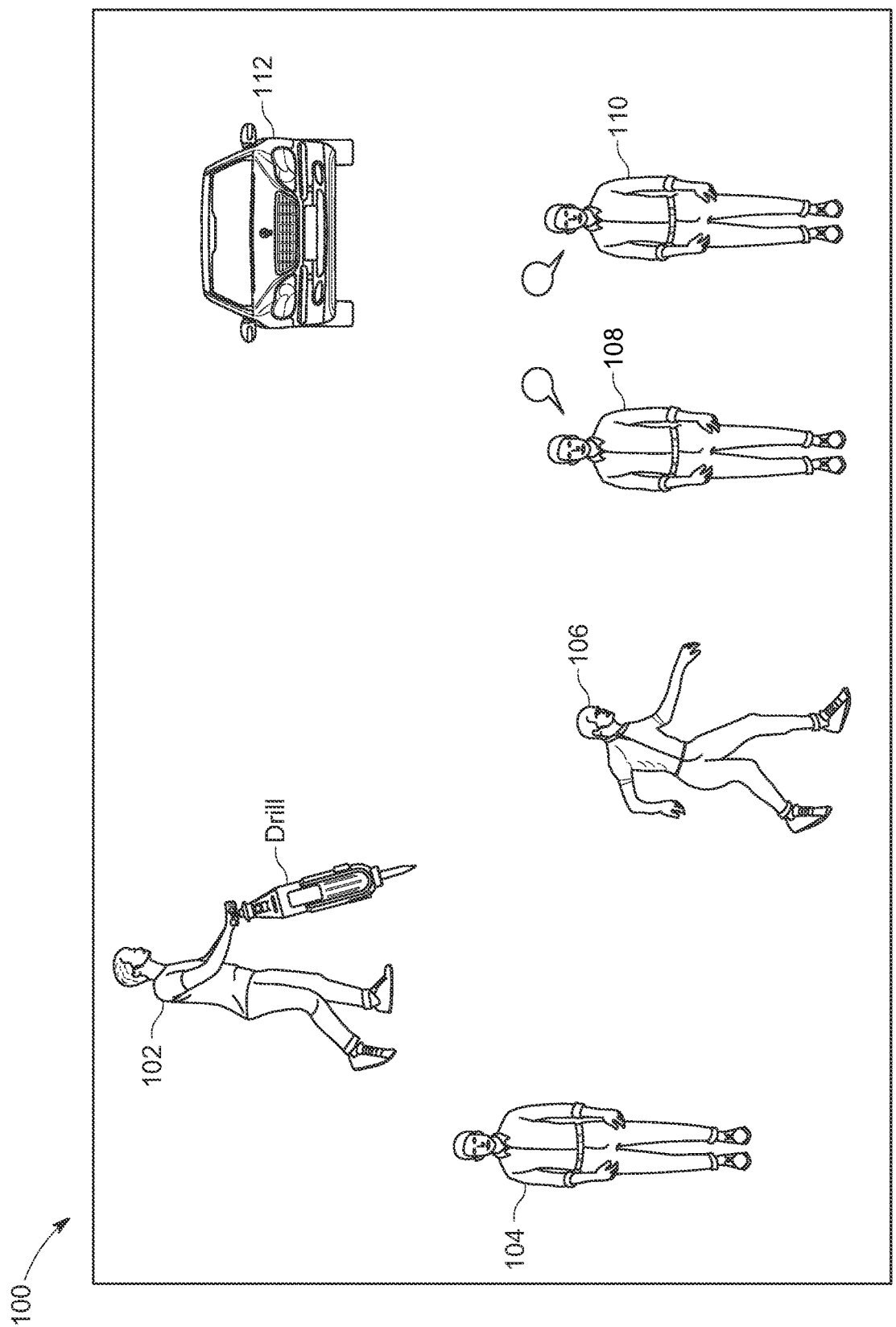
FIG. 1A illustrates an audio scene of an auto repair workshop, according to some embodiments.
Figure 1B:
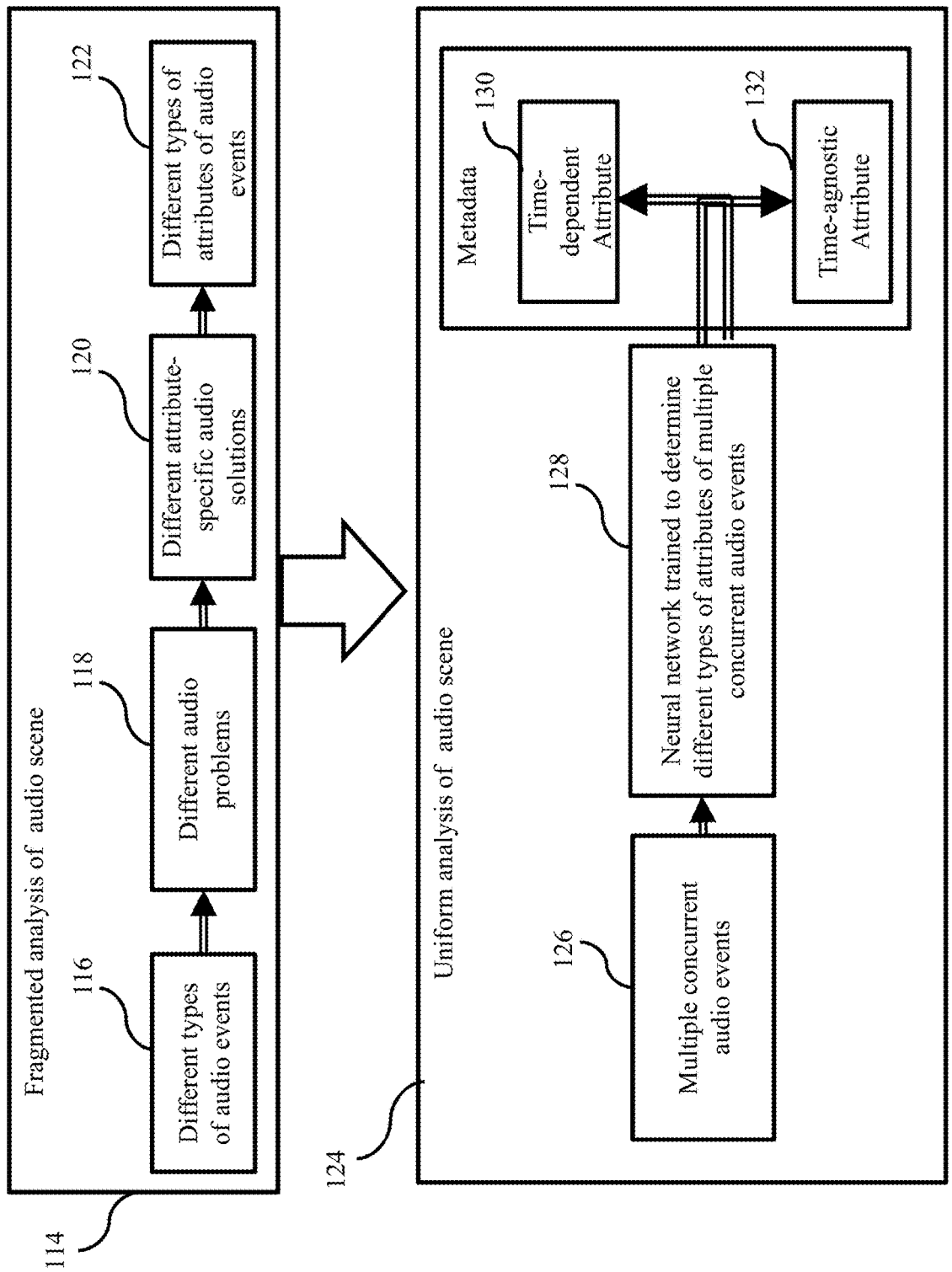
FIG. 1B shows a schematic of principles of audio scene analysis transformation used by some embodiments.

FIG. 1A illustrates an audio scene of an auto repair workshop 100, according to some embodiments. FIG. 1B shows a schematic of principles of audio scene analysis transformation used by some embodiments. FIGS. 1A and 1B are described in conjunction with each other.

The audio scene of the auto repair workshop 100 may include multiple concurrent audio events of different origins, such as sound of drill operating by a repairman 102, voice commands by a repairman 104 to a voice-activated diagnostic tool, running sound of a person 106, a conversation between a repairman 108 and a client 110, sound of an engine 112, and the like. Additionally, or alternatively, the audio scene can include different types of audio events occurring sequentially, i.e., non-overlapping in time. Some embodiments aim to analyze the audio scene to recognize, e.g., detect and classify, the audio events forming the audio scene. The detection and classification of the audio events include determining different types of attributes of the audio events.

For example, the audio scene of the auto repair workshop 100 can include non-speech event such as the sound of the drill operation, and attribute of the sound of the drill can be identification label of "DRILL", "HYDRAULIC-DRILL", "ELECTRIC-DRILL", "VIBRATION-DRILL", etc. Additionally, or alternatively, the audio scene of the auto repair workshop 100 can include speech event such as the voice commands to the voice-activated diagnostic tool and corresponding attributes can be identification of the speech event as a voice command, transcription of the voice command, and/or identification of a speaker. Additionally, or alternatively, for the audio event of the conversation between the repairman 108 and the client 110, the attribute of the conversation can be the transcription of the conversation, i.e., non-command voice utterance. Additionally, or alternatively, an attribute of the audio events can be a natural language sentence describing the audio scene. For example, an audio caption "a repairman talks to a customer before using a drill" describing the audio scene can be the attribute of the audio events.

Accordingly, the different types of attributes of the audio events include time-dependent attributes and time-agnostic attributes of the speech and the non-speech audio events. Examples of the time-dependent attribute include one or a combination of the transcription of speech and a detection of a temporal position of an audio event. Examples of the time-agnostic attribute include labels of the audio events and/or an audio caption of the audio scene. In addition, the attributes can have multiple levels of complexity, such that an audio event can be labeled differently. For example, the sound of the engine 112 can be labeled coarsely as engine or machinery noise or more detailed as car engine, bus engine, big engine, small engine, diesel engine, electric engine, accelerating engine, idling engine, rattling engine, and the like, where multiple labels/attributes can be valid simultaneously. Likewise, the speech event can be labeled as speech/non-speech, female/male voice, speaker ID, singing, screaming, shouting, and the like.

Some embodiments are based on an understanding that fragmented analysis 114 of the audio scene can be carried out to determine the different types of attributes of the audio events 122. In the fragmented analysis 114 of the audio scene, each of the different types of the audio events 116 is considered separately. Consequently, the determination of the attribute of each audio event is treated as separate problem. For example, determining the transcription of speech of the repairman 108 is treated as a separate problem, and determining the attributes of the sound of the engine 112 is treated as a separate problem. Further, determination of each of the different types of attributes of an audio event is treated as separate problem. For example, determining the transcription of speech of the repairman 108 is treated as a separate problem, and determining the labels, for e.g., the speaker ID, of the repairman 108 is treated as a separate problem. To that end, different audio problems 118 exist in determining the different types of attributes of the audio events 122.

Some embodiments are based on recognition that different attribute-specific audio solutions 120 can be leveraged for different audio problems 118 to determine the different types of attributes of the audio events 122. For instance, a neural network trained solely for automatic speech transcription can be used to determine the transcription of speech of the repairman 108, and a neural network trained solely for audio event detection can be used to detect the audio events such as, the sound of the engine 112, running sound of the person 106, etc. Additionally, audio tagging techniques can be used separately to determine the labels for the detected audio events. Some embodiments are based on a recognition that such task-specific neural networks can be combined to unify transcription tasks (such as, automatic speech transcription, audio event detection, etc.) for performing different kinds of transcription tasks (such as, automatic speech transcription, audio event detection, etc.). However, in such an approach, training data scarcity problems in individual transcription task can exist, since such task-specific neural networks cannot leverage fact that audio events of other tasks can have similar audio event characteristics.

Further, some embodiments are based on understanding that neural network trained for one type of transcription task can also benefit execution of another transcription task. For example, the neural network trained solely for automatic speech transcription can be used for different speech events. For example, the neural network trained solely for automatic speech transcription can be used to transcribe the voice command and the conversation between the repairman 108 and the client 110. Some embodiments are based on further understanding that different attribute-specific audio solutions can be applied on an audio event to determine different attributes of the audio event. For example, an automatic speech transcription technique and an audio event technique can be applied on the voice commands to the voice-activated diagnostic tool to determine corresponding attributes such as identification of the speech event as a voice command, transcription of the voice command, and identification of the speaker. To that end, an attribute-specific audio solution can be used for similar audio events to determine same kind of attributes, and different attribute-specific audio solutions 120 can be used for an audio event to determine different types of attributes of the audio event. However, different attribute-specific audio solutions 120 cannot be used for different types of the audio events 116 to determine different attributes of the audio events 122.

Some embodiments are based on realization that, irrespective of type of the audio events and types of attributes of the audio events, the different types of the audio events can be treated uniformly (or as similar audio events) under an assumption that different transcription tasks determine metadata of an audio event. The metadata include attributes describing an audio event. Attributes can be of different types, such as time-dependent and time-agnostic attributes, but regardless of its type, an attribute is just a description forming a metadata of the audio event. In such a manner, determining of the different types of attributes of the audio events can be considered as a single audio problem. Since only a single audio problem is considered, a single solution can be formulated for determining the different types of attributes of the audio events, regardless of complexity of the audio scene. Such a realization allows transforming the fragmented analysis 114 into a uniform analysis 124 of the audio scene. According to an embodiment, the single solution may correspond to a neural network trained to determine the different types of attributes of multiple concurrent and/or sequential audio events of different origins.

To that end, in the uniform analysis 124 of the audio scene according to some embodiments, an audio signal 126 carrying multiple concurrent audio events 126 is input to a neural network 128 trained to determine the different types of attributes of the multiple concurrent audio events 126. The neural network 128 outputs the different types of attributes, such as the time-dependent attributes 130 and the time-agnostic attributes 132. The one or multiple attributes of one or multiple audio events in the audio signal 126 is referred to as metadata of the audio signal 126. Therefore, the audio signal 126 can be processed with the neural network 128 to determine the different types of the attributes of the audio events to produce the metadata 104 of the audio signal 126.

In contrast with multiple neural network trained to perform different transcription tasks in the fragmented analysis of the scene 114, a single neural network 128 trained to performed uniform analysis 124 has a model that shares at least some parameters for determining different types of the attributes 130 and 132 for transcribing different audio events 126. In such a manner, the single solution (the neural network 128) has synergy in its training and performance. In other words, a single neural network (i.e., the neural network 128) can be used to produce the different types of the attributes, as opposed to using different attribute-specific audio solutions to produce the different types of the attributes and can be trained with less data that would be required for training separate neural network performing the transcription of the same tasks. To that end, the synergy can be achieved in determining the different types of attributes of the audio events. Additionally, achieving the synergy diminishes training data scarcity problems in individual transcription task and, also, provides more accurate results. Further, achieving the synergy allows producing customized audio output, i.e., it allows producing desired acoustic information from the audio signal 126.

Figure 2A:
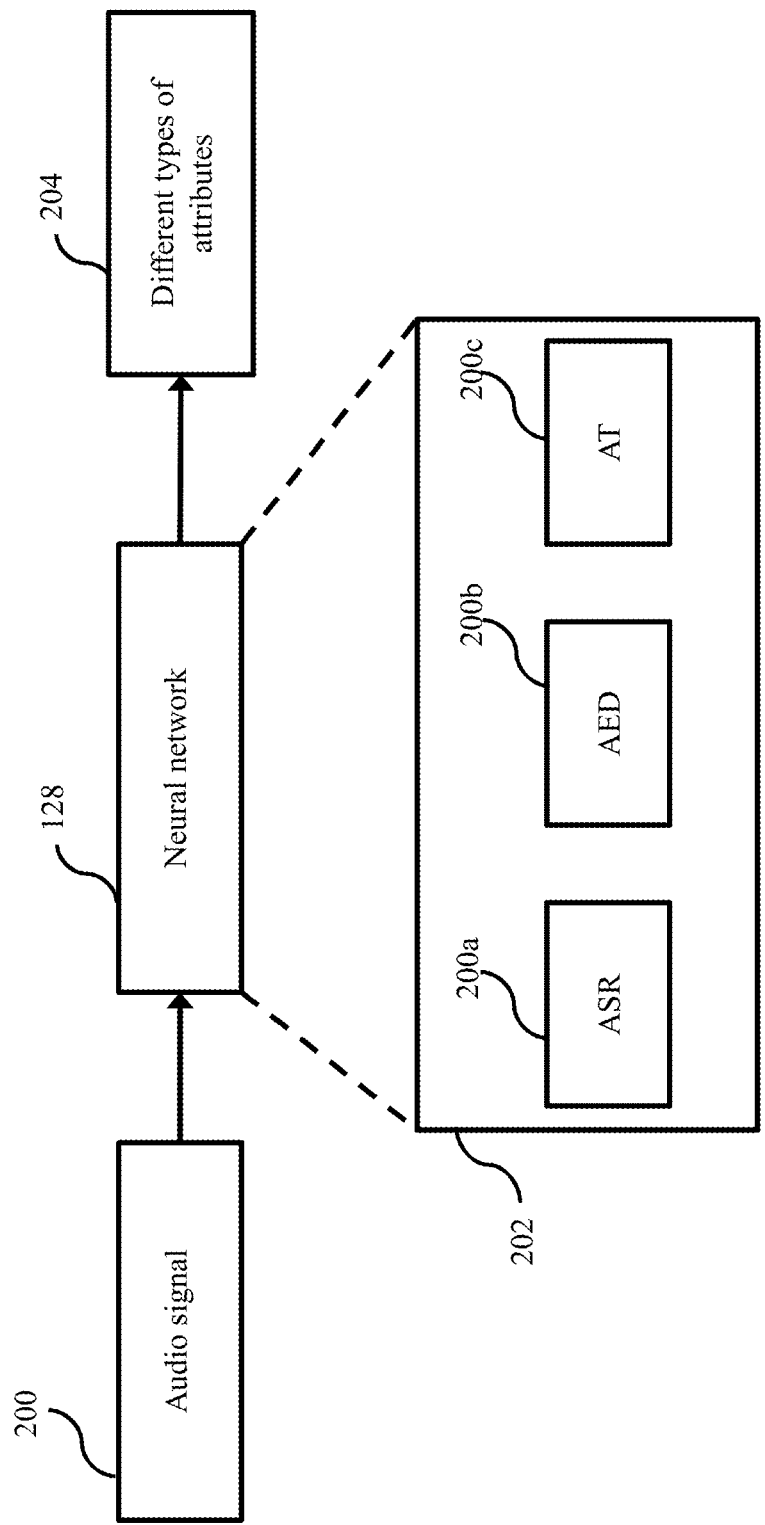
FIG. 2A shows a schematic of a combination of different transcription tasks that can be performed by a neural network to produce different types of the attributes, according to some embodiments.

FIG. 2A shows a schematic of a combination of different transcription tasks that can be performed by the neural network 128 to produce different types of the attributes 204, according to some embodiments. According to an embodiment, the neural network 128 can perform one or combination of different transcription tasks such as automatic speech recognition (ASR), acoustic event detection (AED), and/or audio tagging (AT). The ASR is a field of artificial intelligence and linguistics concerned with transforming audio data associated with speech into text representative of that speech. The AED involves detection of audio events with the corresponding timing information, e.g., the detection of regular household sounds, sounds in an office environment, or other sounds present in the audio scene with temporal start and end positions of each detected audio event. Further, AT provides label tagging for each of the audio events or sets of the audio events of an audio scene without the detection of explicit start and end positions or temporal ordering of the audio events in the audio signal. Additionally, or alternatively, AT can include audio captioning, where a natural language sentence describing the audio scene is determined. Such an audio caption can be the attribute of the audio event. For example, an audio caption "a repairman talks to a customer before using a drill" describing the audio scene can be the attribute of the audio events. Another example for an audio captioning attribute can be "a repairman is operating a drill while asking a client whether he wants to pay by credit card or cash", where synergy between the ASR and AT transcription tasks is needed for recognizing the speech content and the audio events of the audio scene.

An audio signal 200 of an audio scene is input to the neural network 128. The audio signal 200 may carry multiple audio events including a speech event and a non-speech event. The neural network 128 may perform a combination 202 of ASR 200a, AED 200b, and AT 200c transcription tasks. According to some embodiments, the neural network 128 may jointly perform ASR 200a, AED 200b and AT 200c transcription tasks to determine the different types of attributes 204 of the multiple audio events 204. The different types of attributes 204 include a speech attribute of the speech event and a non-speech attribute of the non-speech events. The speech attribute is a time-dependent attribute and includes transcription of speech in the speech event, and the non-speech attribute is time agnostic attribute and includes a label for the non-speech event.

In an alternate embodiment, the neural network 128 may jointly perform the ASR 200a, AED 200b and AT 200c transcription tasks to determine the different types of attributes 204 including the time-dependent attributes and the time-agnostic attributes of the multiple audio events. The time-dependent attributes include one or combination of the transcription of the speech and a detection of temporal positions of the multiple audio events, and the time-agnostic attribute includes tagging the audio signal with one or more of a label or an audio caption describing the audio scene using a natural language sentence.

Figure 2B:
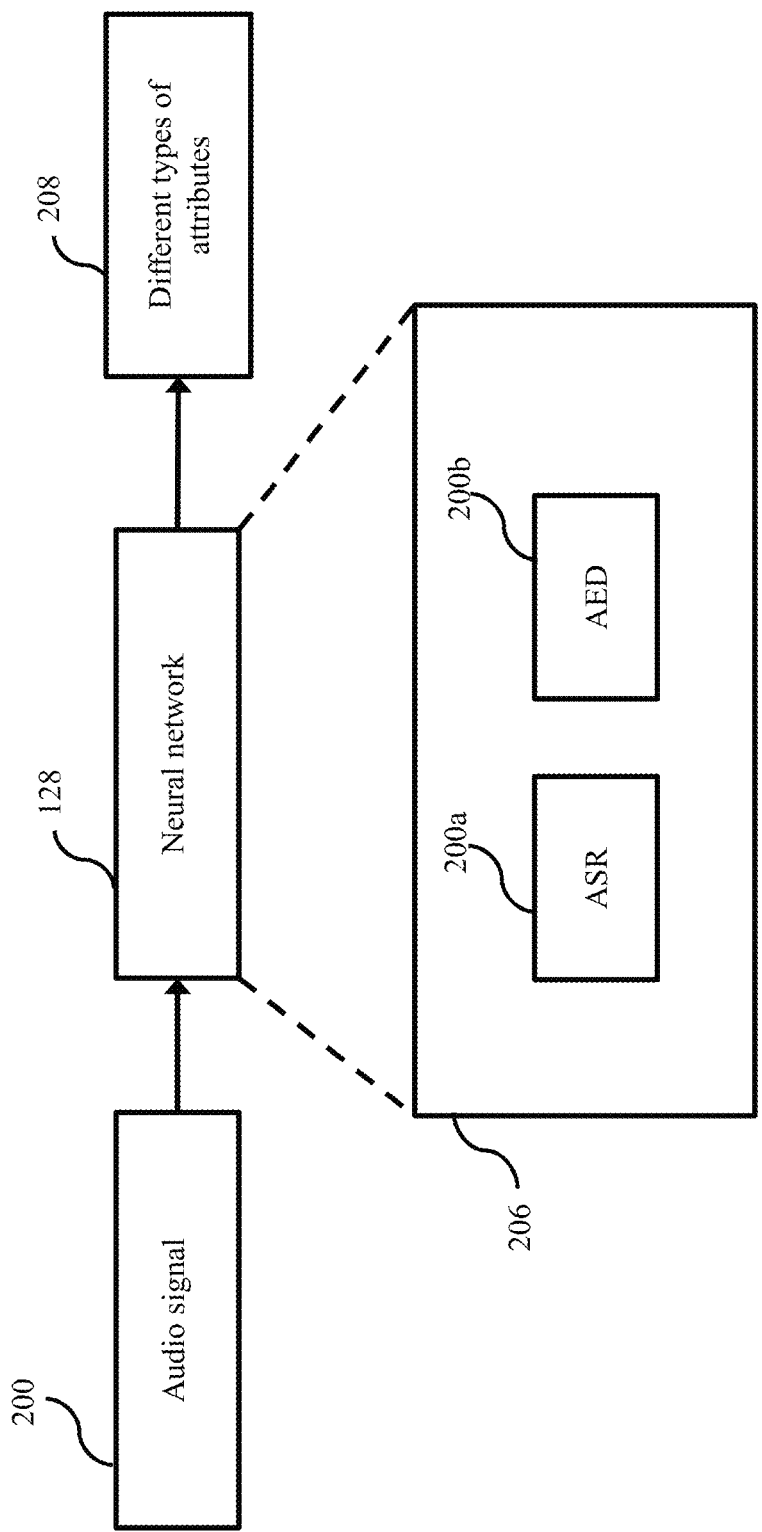
FIG. 2B shows a schematic of a combination of automatic speech recognition (ASR), and acoustic event detection (AED) transcription tasks that can be performed by the neural network to produce different types of the attributes, according to some embodiments.

FIG. 2B shows a schematic of a combination 206 of the ASR and AED transcription tasks that can be performed by the neural network 128 to produce different types of the attributes 208, according to some embodiments. According to some embodiments, the neural network 128 may jointly perform the ASR 200a and AED 200b transcription tasks to determine the different types of attributes 208 of the multiple audio events. The different types of attributes 208 include the transcription of the speech in the speech event, and the detection of the temporal positions of the multiple audio events. In other words, the neural network 128 can simultaneously transcribe the speech and recognize the multiple audio events with corresponding timing information, i.e., temporal start and end positions of each of the multiple audio events.

Figure 2C:
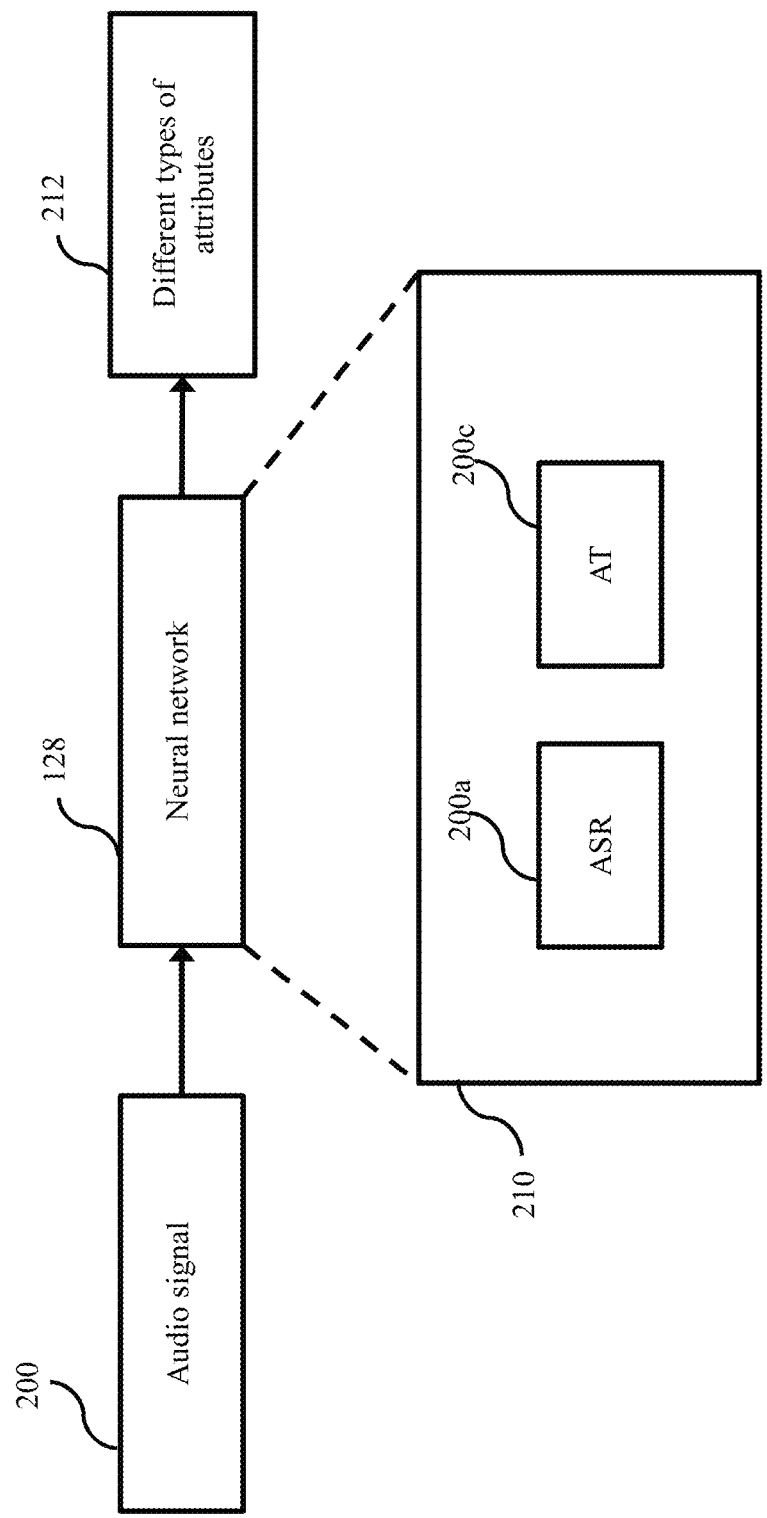
FIG. 2C shows a schematic of a combination of automatic speech recognition (ASR), and audio tagging (AT) transcription tasks that can be performed by the neural network to produce different types of the attributes, according to some embodiments.

FIG. 2C shows a schematic of a combination 210 of ASR and AT transcription tasks that can be performed by the neural network 128 to produce different types of the attributes 212, according to some embodiments. According to some embodiments, the neural network 128 may jointly perform the ASR 200a and AT 200c transcription tasks to determine the different types of attributes 212 of the multiple audio events. The different types of attributes 212 include one or combination of the detection of the speech event, the transcription of the speech in the speech event, labels for the audio signal and an audio caption describing the audio scene using a natural language sentence.

According to some embodiments, a model of the neural network 128 shares at least some parameters for determining the different types of the attributes. In other words, the neural network 128 shares at least some parameters for performing the different transcription tasks to determine the different types attributes. Some embodiments are based on recognition that the neural network 128 sharing some parameters for performing the different transcription tasks to determine the different types attributes can be better aligned with a single human auditory system. Specifically, in auditory pathway, an audio signal passes several processing stages, whereby early stages extract and analyse different acoustic cues, while final stages, in auditory cortex, are responsible for perception. Such processing is in many ways analogous to encoder-decoder neural network architectures, where the encoder extracts the important acoustic cues for a given transcription task, attention mechanism acts as a relay, and a decoder performs the perception, detecting and recognizing audio events in the audio signal. To that end, the model of the neural network includes encoder-decoder architecture.

Figure 3:
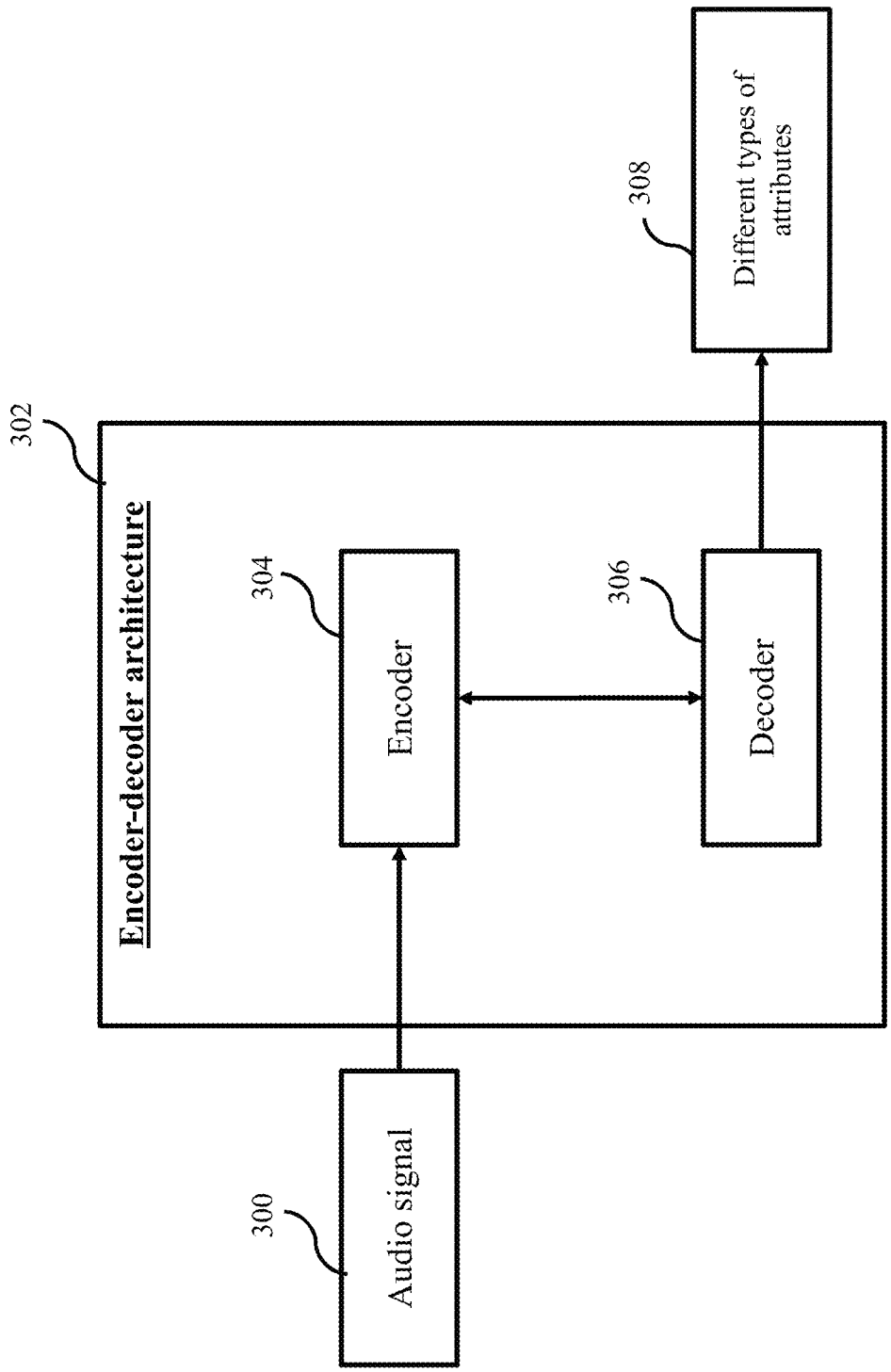
FIG. 3 shows a schematic of a model of the neural network including encoder-decoder architecture, according to some embodiments.

FIG. 3 shows a schematic of a model of the neural network including encoder-decoder architecture 302, according to some embodiments. The encoder-decoder architecture 302 includes an encoder 304 and a decoder 306. An audio signal 300 carrying multiple audio events of different origins is input to the encoder 304. The neural network including encoder-decoder architecture 302 shares some parameters for performing the different transcription tasks to determine the different types of attributes 308. In an embodiment, the parameters shared for determining the different types of the attributes are parameters of the encoder 304. In an alternate embodiment, the parameters shared for determining the different types of the attributes are parameters of the decoder 306. In some other embodiments, the parameters shared for determining the different types of the attributes are parameters of the encoder 306 and the decoder 308. According to an embodiment, the shared parameters correspond to weights of the neural network.

While jointly training the neural network for the different transcription tasks, some parameters (such as weights of the neural network) are reused for performing the transcription tasks. Such joint training of the neural network reusing some parameters of the neural network, requires less training data for training each transcription task, allows to use weakly labeled training data, and yields accurate results even with small amounts of the training data in individual tasks.

Figure 4:
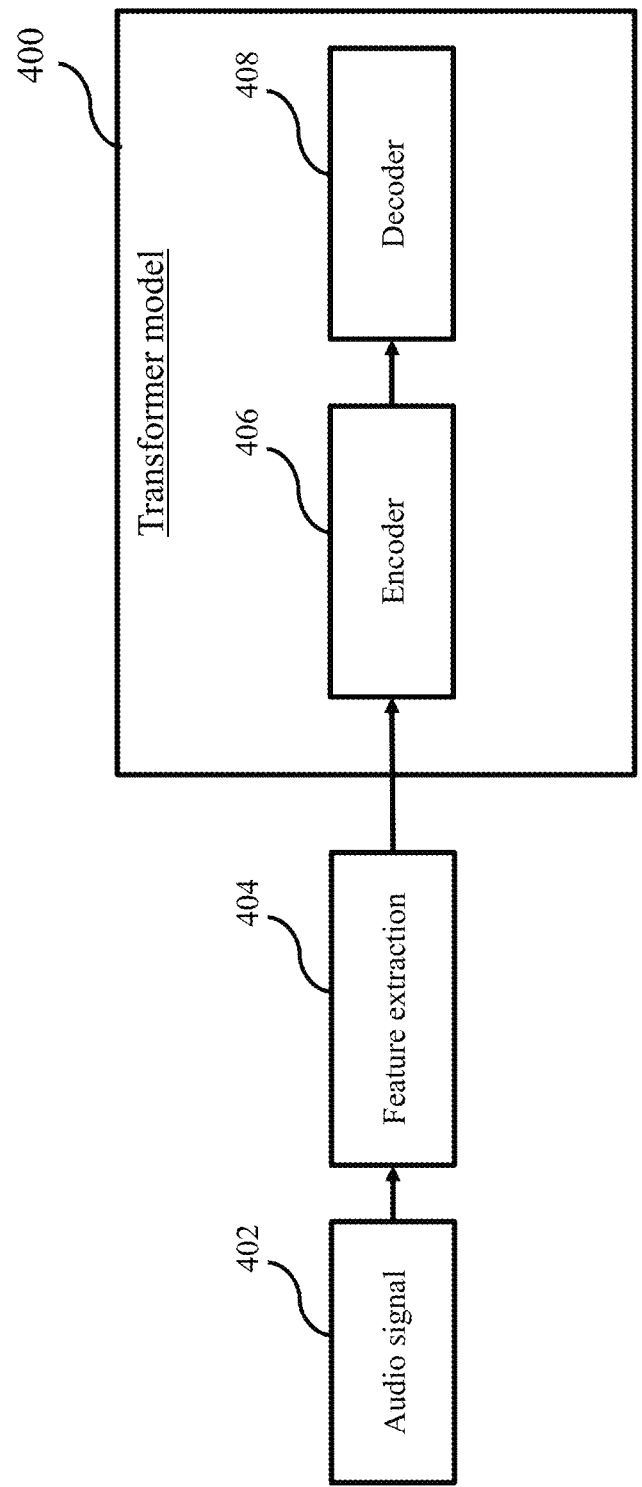
FIG. 4 shows a schematic of a model of the neural network based on a transformer model having encoder-decoder architecture, according to some embodiments.

Some embodiments are based on realization that a neural network based on a transformer model having encoder-decoder architecture can be used for performing the AED and AT transcription tasks. FIG. 4 shows a schematic of a model of the neural network 128 based on a transformer model 400 having encoder-decoder architecture, according to some embodiments. An audio signal 402 is input to a feature extraction 404. The feature extraction 404 is configured to obtain different acoustic features such as spectral energies, power, pitch, and vocal tract information from the audio signal 402.

The transformer model 400 includes an encoder 406 and a decoder 408. The encoder 406 of the transformer model 310 is configured to encode the audio signal 300 and provide encoded audio signal to the decoder 408. Further, for the AED transcription task, the decoder 408 is configured to process the encoded audio signal to execute AED decoding to detect and recognize multiple audio events present in the audio signal 402, without determining temporal information of the detected audio events. Further, for the AT task, the decoder 408 is configured to execute AT decoding. The audio signal 402 is tagged with labels based on the AT decoding. Additionally, the decoder 408 may provide an audio caption to the audio signal 402.

The neural network 128 based on the encoder-decoder architecture provides decisive advantages. For example, in the AED and AT tasks the decoder 408 of the encoder-decoder architecture directly outputs symbols, i.e., the labels. Therefore, the utilization of the encoder-decoder architecture eliminates a cumbersome process of setting detection thresholds for each class during inference, which is otherwise used by AED and AT systems. Additionally, the encoder-decoder architecture based neural network does not require a monotonic ordering of the labels, and can thus easily make use of weakly labeled audio recordings (annotated without temporal or sequential information) for training of the neural network 128.

However, temporal information of the audio signal is needed for the AED and ASR transcription tasks. Some embodiments are based on a realization that the transformer model 400 can be augmented with a connectionist temporal classification (CTC) based model to leverage the temporal information of the audio signal 300.

Figure 5:
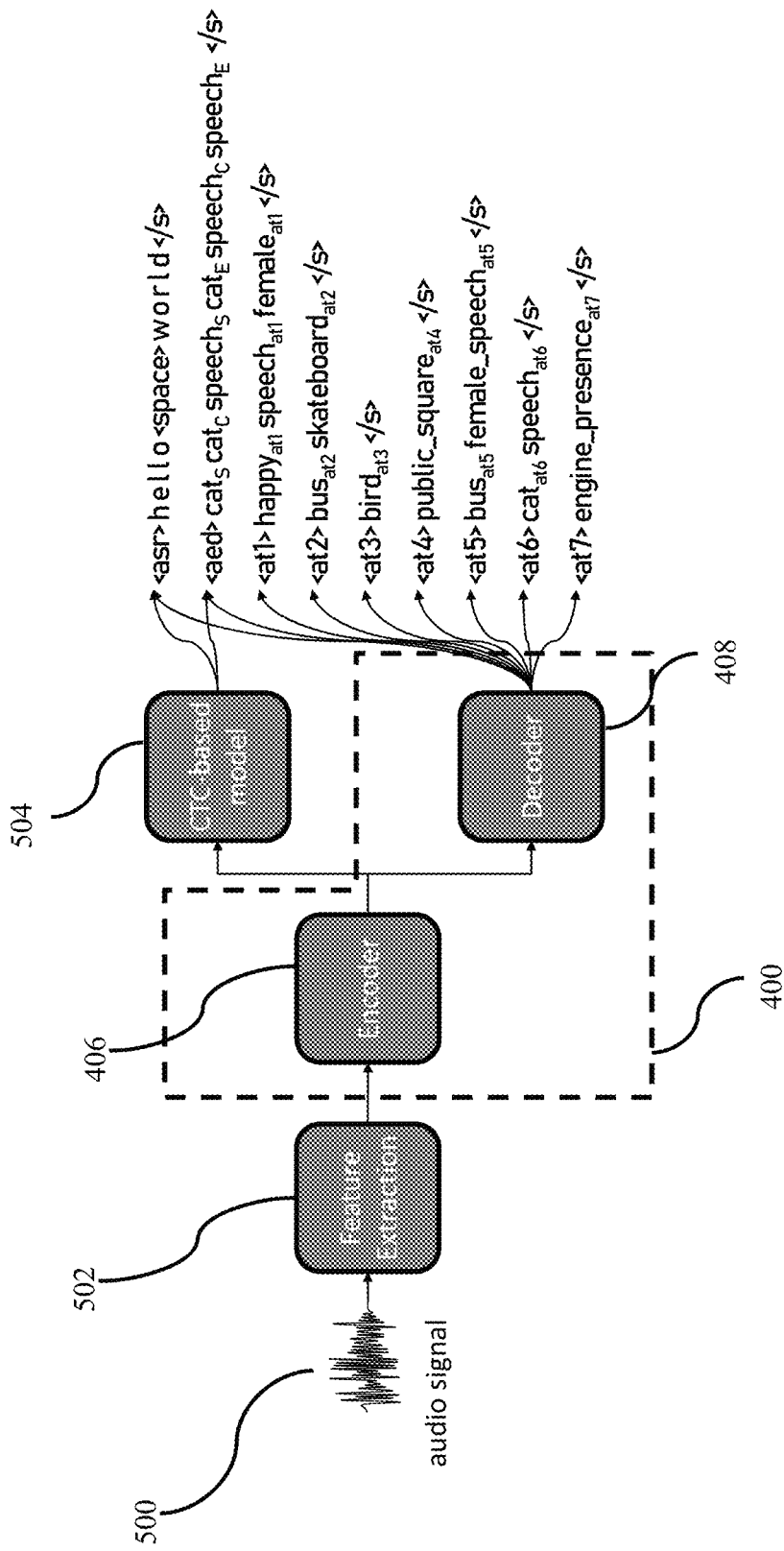
FIG. 5 shows a schematic of a model of the neural network including the transformer model and a connectionist temporal classification (CTC) based model, according to some embodiments.

FIG. 5 shows a schematic of a model of the neural network 128 including the transformer model 400 and a CTC-based model 504, according to some embodiments. According to an embodiment, the CTC-based model 504 corresponds to one or more additional layers added with the encoder 406, which is trained with a CTC objective function. Further, the neural network 128 having the transformer model 400 and the CTC-based model 504 enforces the monotonic ordering and learns a temporal alignment. To that end, the neural network 128 having the transformer model 400 and the CTC-based model 504 can be used to jointly perform the ASR, AED, and AT tasks. The model of the neural network 128 having the transformer model 400 and the CTC-based model 504 may be referred to as all-in-one (AIO) transformer.

An audio signal 500 of an audio scene is input to a feature extraction 502. The feature extraction 502 is configured to obtain different acoustic features such as spectral energies, power, pitch, and/or vocal tract information from the audio signal 500. The encoder 406 of the transformer model 400 encodes an audio signal 500 and provides encoded audio signal to the decoder. The CTC-based model 504 is configured to process the encoded audio signal to produce a CTC output. Since the ASR and AED are temporal information dependent tasks, the transformer model 400 and the CTC-based model 504 are used jointly to perform the ASR and AED. To that end, to perform jointly the ASR and AED task, the encoded audio signal is processed with the decoder 408 to execute ASR decoding and AED decoding. Further, the encoded audio signal is processed with the CTC-based model 504 to produce the CTC output. The CTC output is combined with output of the ASR decoding to produce a transcription of the speech events. Similarly, the CTC output is combined with output of the AED decoding to produce a transcription of the sound event, i.e., the labels for the audio events. In some embodiments the CTC output is further used to compute a temporal position of a detected audio event for the AED decoding, e.g., by using a CTC-based forced alignment, such that start and end times of the audio event are estimated.

The neural network 128 is further configured to perform the AT task, which is time independent, i.e., temporal information of the audio events is not explicitly determined. For the AT task, the decoder 408 is configured to execute the AT decoding. Further, the audio signal is tagged based on the AT decoding. Specifically, acoustic elements (sound events) associated with the audio objects are tagged and/or an audio caption describing the audio scene. To that end, the neural network 128 can perform both the time dependent (ASR and AED) and time independent tasks (AT).

To that end, some embodiments are based on recognition that the neural network 128 can be configured to perform the ASR task to produce the transcription of the speech events in the audio signal 500. Additionally, some embodiments are based on realization that the neural network 128 can be configured to jointly perform the ASR and AED to produce the transcription and the labels for the audio events. According to an embodiment, the neural network 128 can be configured to jointly perform the ASR, AED and AT transcription events to produce in the metadata of the audio signal 500.

Some embodiments are based on recognition that the neural network 128 can be configured to selectively perform one or more of the ASR, AED and AT transcription tasks to output a desired attribute of the audio events. According to an embodiment, output of the transformer model 400 depends on an initial state of decoder 408 of the transformer model 400. In other words, the initial state of the decoder 408 decides whether the decoder 408 will output according to ASR, AT, or AED. To that end, some embodiments are based on recognition that the initial state of the decoder 408 can be varied based on a desired transcription task to be performed to produce the desired attribute. Therefore, the model of neural network 128 is provided with a state switcher.

Figure 6:
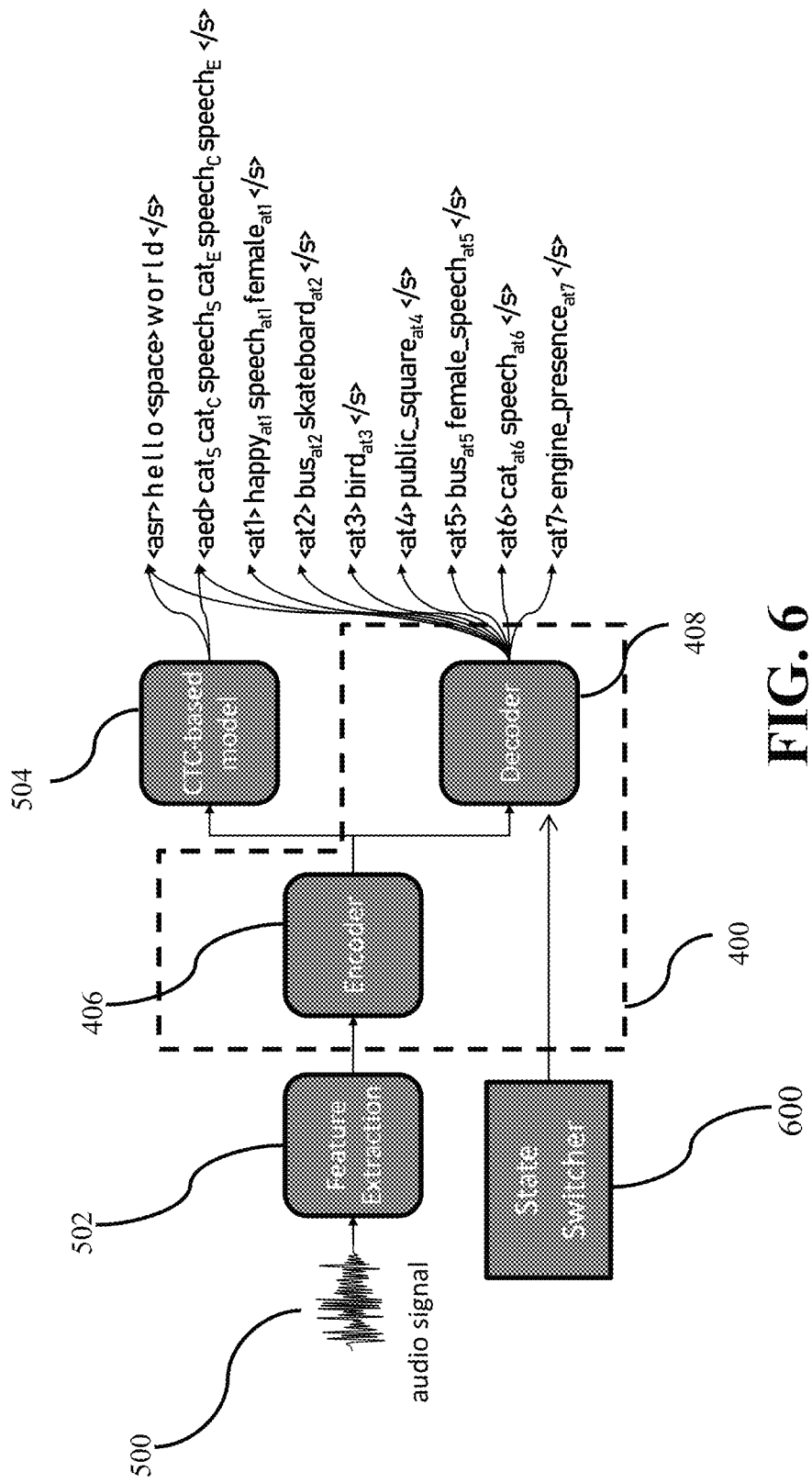
FIG. 6 shows a schematic of a model of the neural network with a state switcher, according to some embodiments.

FIG. 6 shows a schematic of a model of the neural network 128 with a state switcher 600, according to some embodiments. A mapping between the initial states and the different transcription tasks is provided. When the user inputs an input symbol indicating a desired transcription task, the state switcher 600 is configured to switch the initial state corresponding to the desired transcription task to perform the desired transcription task. Consequently, the desired attribute of the audio events can be output by the model of the network 128.

Further, FIG. 6 shows an example output that is switched by initially feeding a start-of-task to the decoder 306, shown in angle brackets (<asr>, <aed>, <at1>, . . . <at7>). </s> denotes a stop symbol for decoding, and label suffixes S, E, and C denote start and end boundaries as well as continuation of a sound event. The ASR and AED are performed jointly with the CTC-based model, whereas AT uses only the decoder output.

Figure 7:
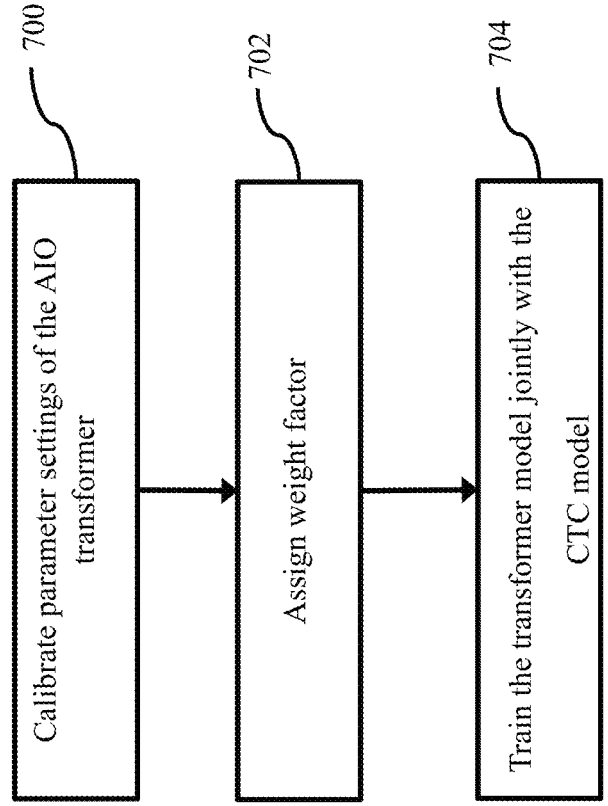
FIG. 7 shows a schematic of training of the neural network for performing ASR, AED, or AT on an audio signal, according to some embodiments.

FIG. 7 shows a schematic of training of the neural network 128 for performing ASR, AED, or AT on the audio signal, according to some embodiments. At block 700, parameter settings of the AIO transformer are calibrated. For example, the parameter settings of the AIO transformer are $d_{model}=256$, $d_{ff}=2048$, $d_h=4$, E=12, and D=6. Adam optimizer with $\beta_1=0.9$, $\beta_2=0.98$, and $\varepsilon=10^{-9}$ is applied for training using 25000 warmup steps. Additionally, initial learning rate is set to 5.0 and a number of training epochs amounts to 80.

Further, at block 702, weight factor is assigned to a set of ASR samples and a set of AED samples, respectively, to balance loss of the transformer model and loss of the CTC-based model while training. For example, the CTC/decoder weight factor is set to 0.3/0.7 for the set of the ASR samples, 0.4/0.6 for the set of the AED samples, and to 0.0/1.0 otherwise. The same weight factors are used for decoding as well. In addition, in an alternate embodiment, the weight factor is assigned to a set of AT samples. The weight factor is used to control weighting between a transformer objective function and a CTC objective function. In other words, the weight factor is used to balance the transformer objective function and the CTC objective function during training. Such samples assigned with respective weight factor are used for the training of the neural network 128. For ASR inference, a neural network based language model (LM) is applied via shallow fusion using an LM weight of 1.0. For the AED task, temporal information for the recognized sound event sequence is obtained by using CTC-based forced alignment.

At block 704, the transformer model is jointly trained with the CTC-based model to perform the ASR, AED and AT transcription tasks. The set of ASR samples, the set of AED samples and the set of AT samples are used with the transformer model and the CTC-based model to train the neural network for jointly performing ASR, AED, or AT transcription tasks. The time independent task, such as the AT task, does not require the temporal information. Therefore, the set of AT samples are used only with transformer model for learning the AT transcription task. Some embodiments are based on the realization that, to perform the time dependent tasks (ASR and AED), the transformer model is trained jointly with the CTC-based model to leverage monotonic alignment properties of the CTC. Therefore, the transformer model is jointly trained with the CTC-based model, using the set of ASR samples the set of AED samples, to perform the ASR and AED transcription tasks.

The AIO transformer leverages two different attention types, namely, encoder-decoder attention and self-attention. The encoder-decoder attention uses the decoder state as a query vector to control attention to a sequence of input values, and a sequence of encoder states. In self-attention (SA), queries, values, and keys are computed from same input sequence, which results in an output sequence of the same length as the input. Both attention types of the AIO transformer are based on a scaled dot-product attention mechanism $$\text{Attention}(Q, K, V) = \text{Softmax}\left(\frac{QK^T}{\sqrt{d_k}}\right)V \quad (1)$$

where $Q\in R^{n_q\times d_q}$, $K\in R^{n_k\times d_k}$, and $K\in R^{n_v\times d_v}$ the queries, keys, and values, where the $d_*$ denote dimensions, the $n_*$ denote sequence lengths, $d_q=d_k$, and $n_k=n_v$. Instead of using a single attention head, multiple attention heads are used by each layer of the AIO transformer model with $$\text{MHA}(\hat{Q},\hat{K},\hat{V})=\text{Concat}(\text{Head}_1,\ldots,\text{Head}_{d_h})W^H \quad (2)$$

$$\text{Head}_i=\text{Attention}(\hat{Q}W_i^Q,\hat{K}W_i^K,\hat{V}W_i^V), \quad (3)$$

where $\hat{Q}$, $\hat{K}$, and $\hat{V}$ are inputs to multi-head attention (MHA) layer, Head$_i$ represents output of the i-th attention head for a total number of $d_h$ heads, and $W_i^Q\in R^{d_{model}\times d_q}$, $W_i^K\in R^{d_{model}\times d_k}$, $W_i^V\in R^{d_{model}\times d_v}$ as well as $W^H\in R^{d_hd_v\times d_{model}}$ are trainable weight matrices that satisfy $d_k=d_v=d_{model}/d_h$.

The encoder of the AIO transformer includes a two-layer CNN module ENCCNN and a stack of E Transformer encoder layers with self-attention ENCSA:

$$X_0=\text{ENCCNN}(X), \quad (4)$$

$$X_E=\text{ENCSA}(X_0), \quad (5)$$

where $X=(x_1,\ldots,x_T)$ denotes a sequence of acoustic input features, which are 80-dimensional log mel-spectral energies (LMSEs) plus three extra features for pitch information. Both CNN layers of ENCCNN use a stride of size 2, a kernel size of 3×3, and a ReLU activation function, which reduces frame rate of output sequence $X_0$ by a factor of 4. The ENCSA module of (5) consists of E layers, where the e-th layer, for e=1, ..., E, is a composite of a multi-head self-attention layer and two ReLU-separated feed-forward neural networks of inner dimension $d_{ff}$ and outer dimension $d_{model}$:

$$X_e'=X_{e-1}+\text{MHA}_e(X_{e-1},X_{e-1},X_{e-1}), \quad (6)$$

$$X_e=X_e'+\text{FF}_e(X_e'), \quad (7)$$

$$\text{FF}_e(X_e')=\text{ReLU}(X_e'W_{e,1}^{ff}+b_{e,1}^{ff})W_{e,2}^{ff}+b_{e,2}^{ff} \quad (8)$$

where $W_{e,1}^{ff}\in R^{d_{model}\times d_{ff}}$, $W_{e,2}^{ff}\in R^{d_{ff}\times d_{model}}$, $b_{e,1}^{ff}\in R^{d_{ff}}$, and $b_{e,2}^{ff}\in R^{d_{model}}$ are trainable weight matrices and bias vectors.

The transformer objective function is defined as $$p_{att}(Y|X_E)=\prod_{l=1}^{L}p(y_l|y_{1:l-1},X_E) \quad (9)$$

with label sequence $Y=(y_1,\ldots,y_L)$, label subsequence $y_{1:l-1}=(y_1,\ldots,y_{l-1})$, and encoder output sequence $X_E$. The term $p(y_l|y_{1:l-1},X_E)$ represents the transformer decoder model, which can be written as $$p(y_l|y_{1:l-1},X_E)=\text{DEC}(X_E,y_{1:l-1}), \quad (10)$$

with $$z_{1:l}^0=E_{\text{MBED}}((s)_\theta,y_1,\ldots,y_{l-1}), \quad (11)$$

$$\bar{z}_l^d=z_l^{d-1}+\text{MHA}_d^{self}(z_l^{d-1},z_{1:l}^{d-1},z_{1:l}^{d-1}), \quad (12)$$

$$\tilde{z}_l^d=\bar{z}_l^d+\text{MHA}_d^{dec}(\bar{z}_l^d,X_E,X_E), \quad (13)$$

$$z_l^d=\tilde{z}_l^d+\text{FF}_d(\tilde{z}_l^d), \quad (14)$$

for d=1, ..., D, where D denotes a number of decoder layers. Function EMBED converts the input label sequence (<s>$_\theta$, $y_1$, ..., $y_{l-1}$) into a sequence of trainable embedding vectors $z_{1:l}^0$, where <s>$_\theta\in\Theta$ denotes a task specific start symbol (or input symbol) using $\theta$ to index sequence $\Theta$=(<asr>, <aed>, <at1>, ..., <at7>), as shown in FIG. 3.

Function DEC finally predicts posterior probability of label $y_l$ by applying a fully-connected neural network 128 to $z_l^D$ and a softmax distribution over that output. Sinusoidal positional encodings are added to the sequences $X_0$ and $Z_0$.

For the ASR and AED tasks, the transformer model is trained jointly with the CTC objective function $$p_{ctc}(Y|X_E)=\sum_{x\in B^{-1}(Y)}p(\pi|X_E), \quad (15)$$

where $B$ denotes a one-to-many map to expand the label sequence Y to a set of all possible frame-level label sequences using CTC transition rules. $\pi$ represents a frame-level label sequence. A multi-objective loss function $$\mathcal{L}=-\gamma\log p_{ctc}-(1-\gamma)\log p_{att} \quad (16)$$

is used for training the neural network 128, where hyperparameter $\gamma$ is used to control the weighting between the two objective functions $p_{ctc}$ and $p_{att}$.

For joint decoding, some implementations use the sequence probabilities of the CTC-based model $p_{ctc}(Y|X_E)$ and the attention-based decoder model $p_{att}(Y|X_E)$ to define the decoding objective to find the most probable label sequence $$\hat{Y}=\arg\max\{\lambda\log p_{ctc}(Y|X_E)+(1-\lambda)\log p_{att}(Y|X_E)\}, \quad (17)$$

where $\lambda$ denotes a weight factor to balance the CTC and the attention-based decoder probabilities, and where $p_{ctc}(Y|X_E)$ can be computed using a CTC prefix decoding algorithm.

Figure 8:
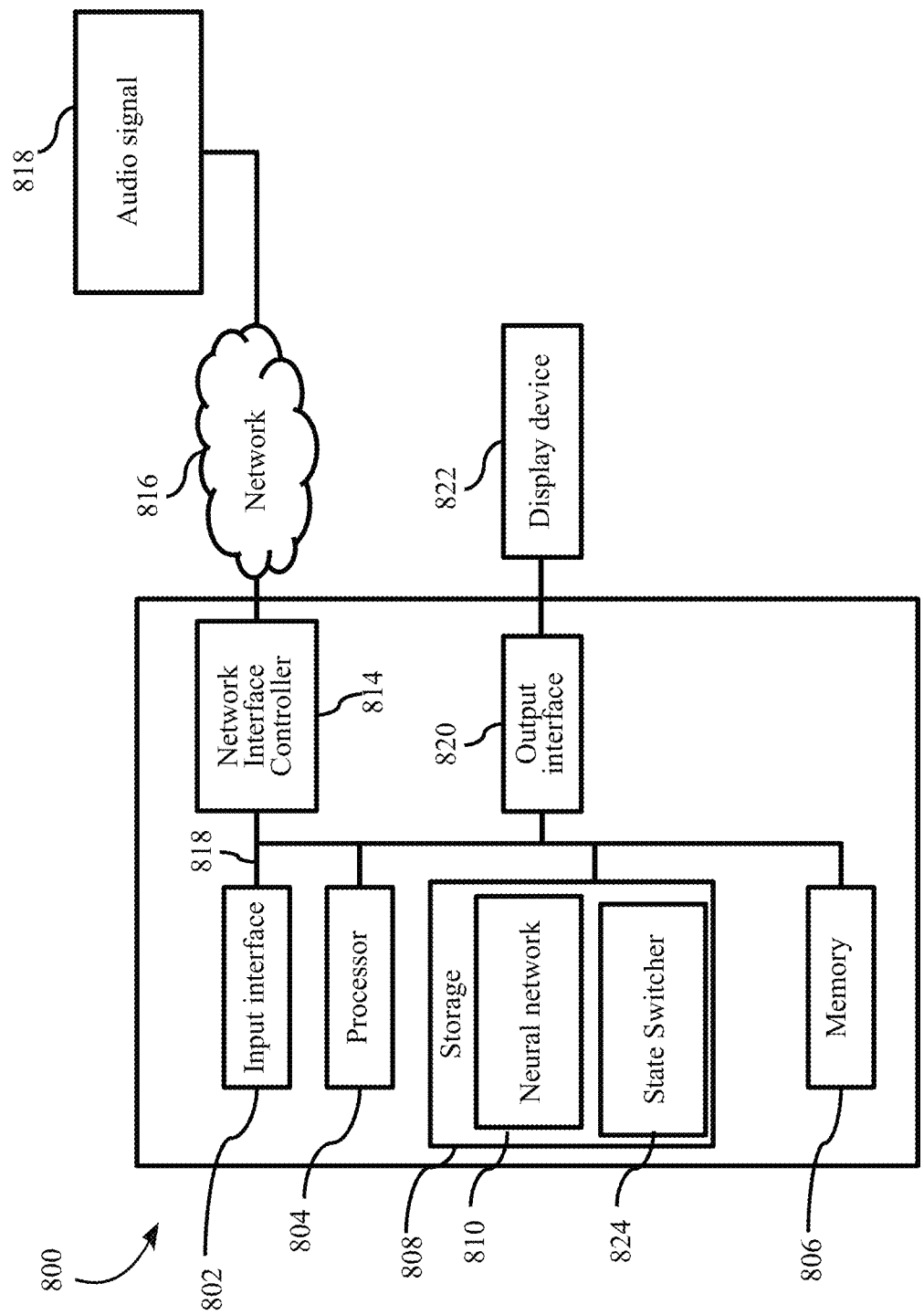
FIG. 8 shows a block diagram of an audio processing system producing metadata of the audio signal, according to some embodiments.

FIG. 8 shows a block diagram of an audio processing system 800 for producing the metadata of the audio signal, according to some embodiments. The audio processing system 800 includes an input interface 802. The input interface 802 is configured to accept the audio signal. In an alternate embodiment, the input interface 802 is further configured to accept an input symbol indicative of a desired transcription task.

The audio processing system 800 can have a number of interfaces connecting the audio processing system 800 with other systems and devices. For example, a network interface controller (NIC) 814 is adapted to connect the audio processing system 800, through a bus 812, to a network 816 connecting the audio processing system 800 with the operatively connected to a set of sensors. Through the network 816, either wirelessly or through wires, the audio processing system 800 receives the audio signal.

The audio processing system 800 includes a processor 804 configured to execute stored instructions, as well as a memory 806 that stores instructions that are executable by the processor 804. The processor 804 can be a single core processor, a multi-core processor, a computing cluster, or any number of other configurations. The memory 806 can include random access memory (RAM), read only memory (ROM), flash memory, or any other suitable memory systems. The processor 804 is connected through the bus 812 to one or more input and output devices.

According to some embodiments, the instructions stored in the memory 806 implement a method for producing the metadata on the audio signal received via the input interface 802. To that end, the storage device 808 can be adapted to store different modules storing executable instructions for the processor 804. The storage device 808 can be implemented using a hard drive, an optical drive, a thumb drive, an array of drives, or any combinations thereof.

The storage device 808 is configured to store parameters of a neural network 810 trained to determine the different types of the attributes of multiple concurrent audio events of different origins. The different types of attributes include the time-dependent and the time-agnostic attributes of the speech events and non-speech audio events. A model of the neural network 810 shares at least some parameters for determining both types of the attributes. The model of the neural network 810 includes a transformer model and a connectionist temporal classification (CTC) based model. The transformer model includes an encoder configured to encode the audio signal and a decoder configured to execute ASR decoding, AED decoding, and AT decoding for the encoded audio signal. The CTC-based model is configured to execute the ASR decoding and the AED decoding, for the encoded audio signal, to produce a CTC output. According to an embodiment, the transformer model is jointly trained with the CTC model to perform the ASR and AED transcription tasks. The storage device 808 is further configured to store state switcher 824 configured to switch an initial state of the decoder according to the input symbol to perform the desired transcription task.

In some embodiments, the processor 804 of the audio processing system 800 is configured to process the audio signal with the neural network 810 to produce metadata of the audio signal. The processor 804 is also configured to process the audio signal with the encoder of the neural network 810 to produce an encoding and process the encoding multiple times with the decoder initialized to different states corresponding to the different types of the attributes to produce different decodings of the attributes of different audio events. Additionally, in an alternate embodiment, the processor 804 is further configured to switch a decoder state according to the input symbol to perform the desired transcription task, and produce, using the neural network 810 an output of the desired task. The produced output is a part of the multi-level information.

Further, the audio processing system 800 includes an output interface 820. In some embodiments, the audio processing system 800 is further configured to submit, via the output interface 820, the metadata of the audio signal, to the display device 822. Examples of the display device 822 include a computer monitor, camera, television, projector, or mobile device, among others. In an embodiment, the audio processing system 900 can also be connected to an application interface adapted to connect the audio processing system 800 to an external device for performing various tasks.

Figure 9:
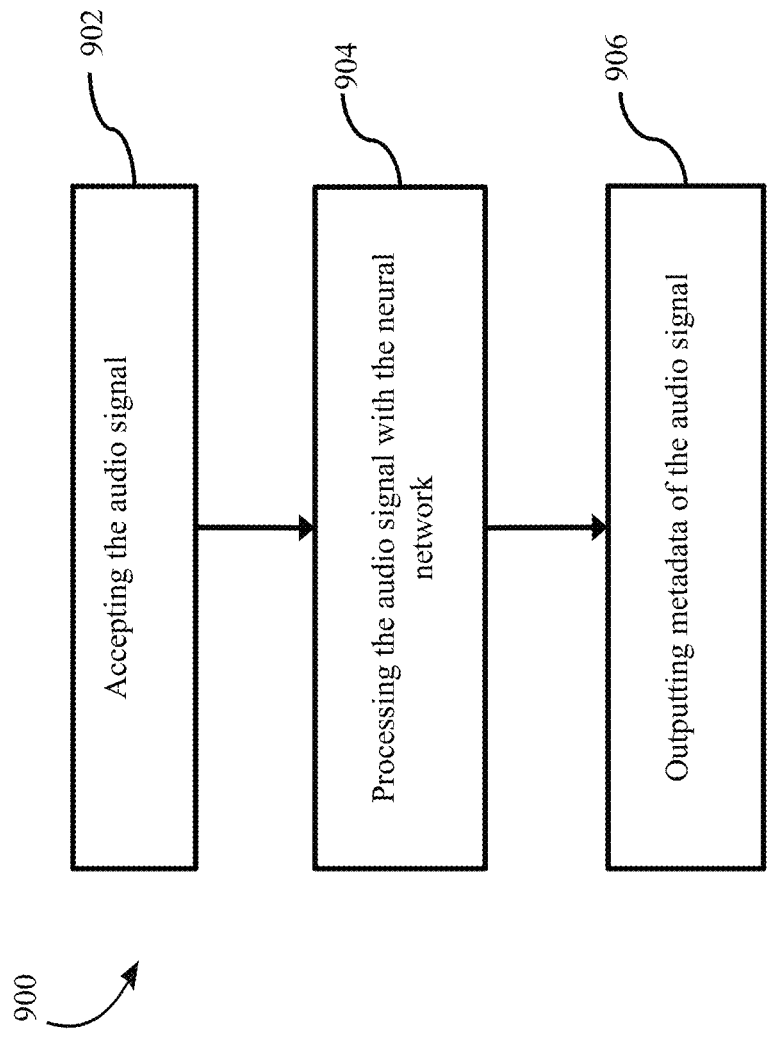
FIG. 9 shows a flowchart of an audio processing method for producing the metadata of the audio signal, according to some embodiments.

FIG. 9 shows a flowchart of an audio processing method 900 for producing the metadata of the audio signal, according to some embodiments of the present disclosure. At block 902, the audio processing method 500 includes accepting the audio signal. In an embodiment, the audio signal is accepted via the input interface 802.

Further, at block 904, the audio processing method 900 includes processing the audio signal with the neural network 810 to produce metadata of the audio signal. The metadata includes one or multiple attributes of one or multiple audio events in the audio signal. The one or more attributes include the time-dependent and the time-agnostic attributes of the speech events and non-speech audio events.

Furthermore, at block 906, the audio processing method 900 includes outputting the metadata of the audio signal. In an embodiment, the multi-level information is outputted via the output interface 820.

Figure 10:
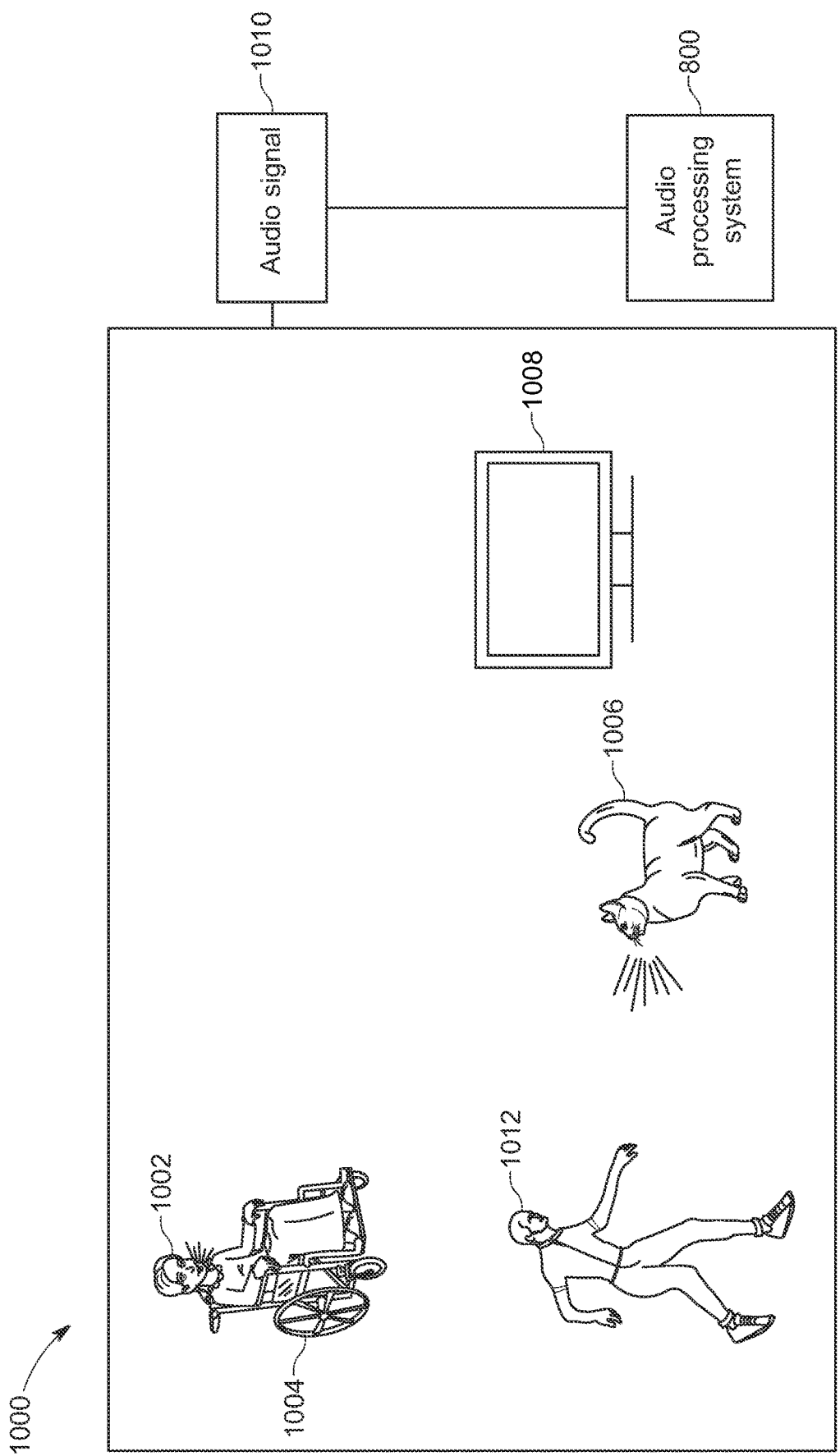
FIG. 10 illustrates utilization of the audio processing system for analysing a scene, according to some embodiments.

FIG. 10 illustrates utilization of the audio processing system 800 for auditory analysis of a scene 1000, according to some embodiments. The scene 1000 includes one or more audio events. For example, the scene 1000 includes the audio events such as speech of a person 1002 moving on a wheelchair 1004, sound of a cat 1006, an entertainment device 1008 playing music, and sound of footsteps by a second person 1012. The audio signal 1010 of the scene 1000 is captured via one or more microphones (not shown in figure). The one or more microphones may be placed at one or more suitable places in the scene 1000 such that they capture the audio signal including the audio events present in the scene 1000.

The audio processing system 800 is configured to accept the audio signal 1010. The audio processing system 800 is further configured to perform, using the neural network 128, ASR, AED, or AT tasks on the audio signal 1010 to produce the attributes associated with the audio events in the audio signal. For example, the audio processing system 800 may produce transcription of speech of the person 1002. Further, the audio processing system 800 may recognize sound events in the scene 1000, such as moving wheelchair 1004, the speech by the person 1002, the sound of the cat 1006, the music playing in the entertainment device 1008, footsteps of second person 1012 and the like.

Additionally, according to an embodiment, the audio processing system 800 may provide labels for the speech of the person 1002, such as male/female voice, singing, and speaker ID. Such different types of the attributes produced by the audio processing system 800 may be referred to as the metadata of the audio signal 1010. The metadata of the audio signal 1010 may be further used to analyze the scene 1000. For example, the attributes may be used to determine various activities occurring in the scene 1000. Similarly, the attributes can be used to determine various audio events occurring in the scene 1000.

Additionally, or alternatively, the audio processing system 800 can be used in one or more of in-vehicle infotainment system including voice search interface and hands-free telephony, voice interface for elevator, service robots, and factory automation, in accordance with the embodiments of the present disclosure.

Figure 11:
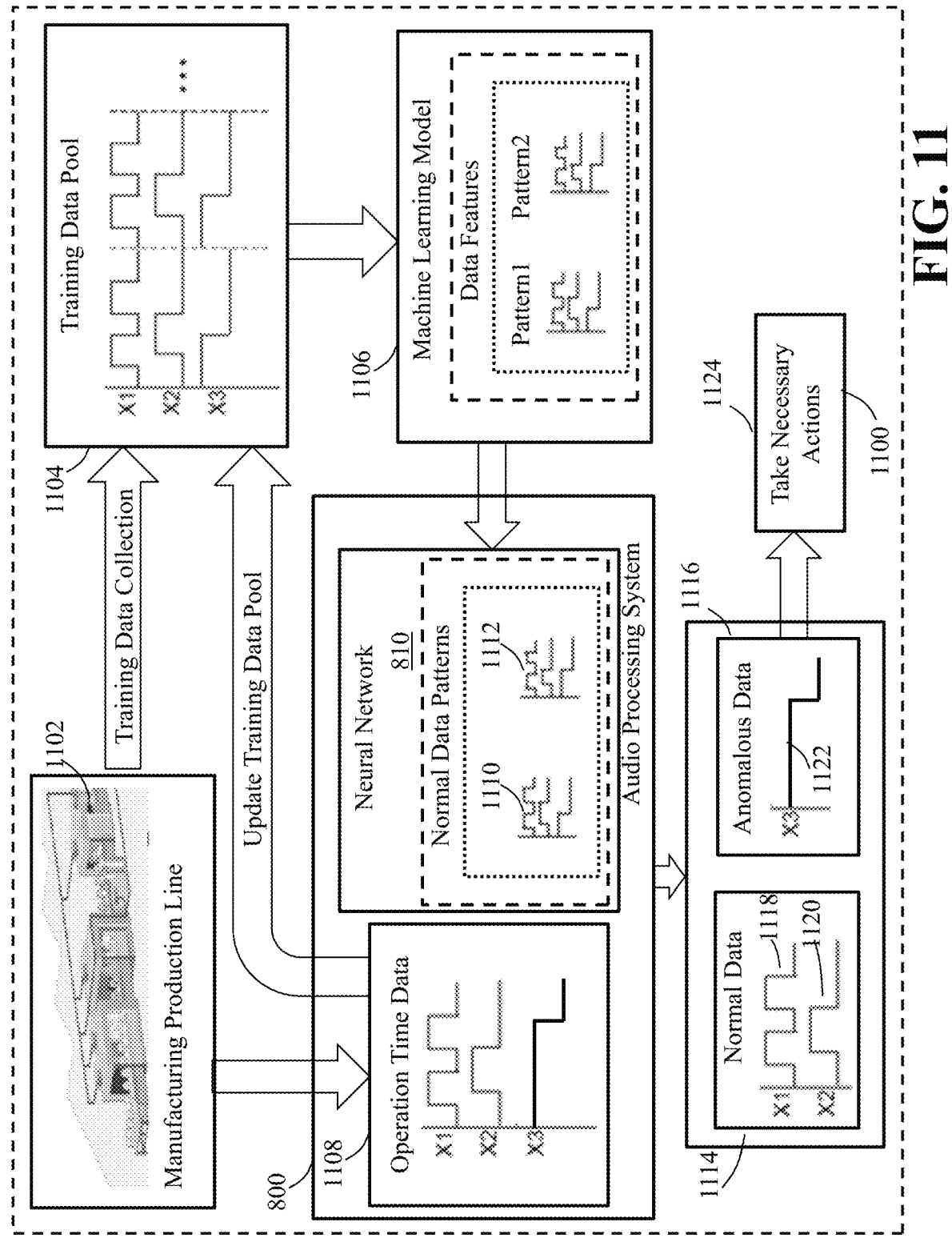
FIG. 11 illustrates anomaly detection by the audio processing system, in accordance with an example embodiment.

FIG. 11 illustrates anomaly detection by the audio processing system 800, in accordance with an example embodiment. In FIG. 11, there is shown a scenario 1100 including a manufacturing production line 1102, a training data pool 1103, machine learning model 1106 and the audio processing system 200. The manufacturing production line 1102 comprises multiple engines which work together to manufacture products. Further, the production line 1102 uses sensors to collect data. The sensor may be digital sensors, analog sensors, and combination thereof. The collected data serve two purposes, some of data is stored in training data pool 1104 and used as training data to train the machine learning model 1106 and some of data is used as operation time data by the audio processing system 200 to detect anomaly. Same piece of data may be used by both the machine learning model 1106 and the audio processing system 200.

To detect anomaly in the manufacturing production line 1102, the training data is collected. The training data in training data pool 1104 is used by the machine learning model 1106 to train the neural network 210. The training data pool 1104 can include either labeled data or unlabeled data. The labeled data is tagged with labels, e.g., anomalous or normal and the unlabeled data has no label. Based on a type of the training data, the machine learning model 1106 applies different training approaches to detect anomaly. For the labeled training data, supervised learning is typically used and for the unlabeled training data, unsupervised learning is applied. In such a manner, different embodiments can handle different types of data. Further, detecting anomaly in the manufacturing production line 1102 comprises detecting anomaly in each engine of the multiple engines comprised by the manufacturing production line 1102.

The machine learning model 1106 learns features and patterns of the training data, which include the normal data patterns and abnormal data patterns associated with audio events. The audio processing system 800 uses the trained neural network 128 and collected operation time data 1108 to perform anomaly detection, where the operation time data 1108 may comprise multiple concurrent audio events associated with the multiple engines.

On reception of the operation time data 1108, the audio processing system 800 may determine, using the neural network 810 metadata of the each of the audio event associated with each engine. The metadata of the audio event associated with the engine may include attributes such as accelerating engine, idling engine, rattling engine, clacking engine, and the like. Such attributes may enable the user to analyze sound of each engine of the multiple engines, thereby, enabling the user to analyze the manufacturing production line 1102 at a granular level. Further, the operation time data 1108 can be identified as normal or abnormal. For example, using normal data patterns 1110 and 1112, the trained neural network 810 may classify operation time data into normal data 1114 and abnormal data 1116. For example, operation time data X1 1118 and X2 1120 are classified as normal and operation time data X3 1122 is classified as anomalous. Once anomaly is detected, necessary actions are taken 1124.

In particular, the audio processing system 800 determines, using the neural network 810, at least one attribute of the audio event associated with an audio source (such as, the engine) of multiple audio sources. Further, the audio processing system 800 compares the at least one attribute of the audio event associated with the audio source with at least one predetermined attribute of the audio event associated with the audio source. Further, the audio processing system 800 determines the anomaly in the audio source based on a result of the comparison.

Figure 12:
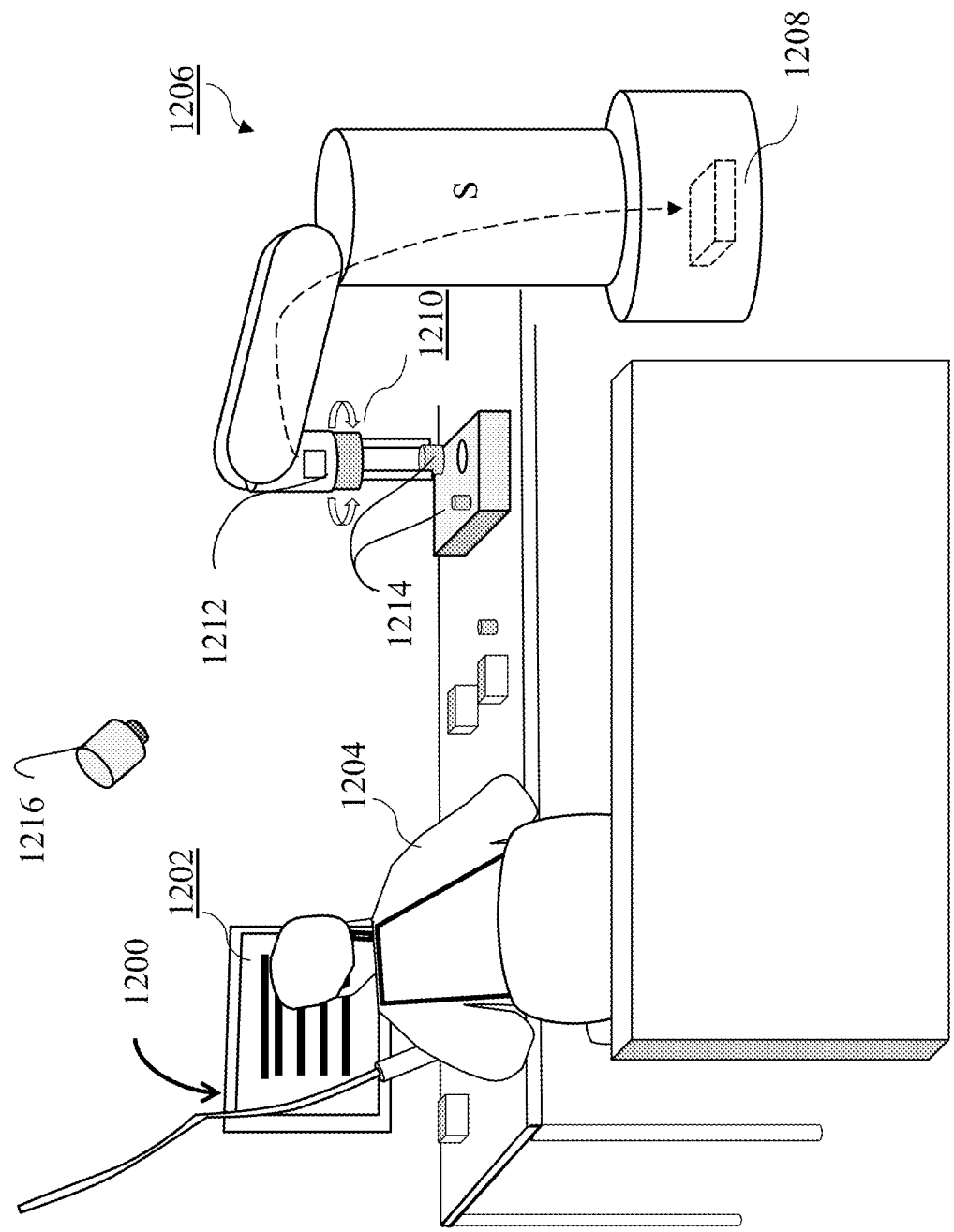
FIG. 12 illustrates a cooperative operation system using the audio processing system, according to some embodiments.

FIG. 12 illustrates a cooperative operation system 1200 using the audio processing system 800, according to some embodiments. The cooperative system 1200 may be arranged in part of product assembly/manufacturing lines. The cooperative operation system 1200 includes the audio processing system 800 with, the NIC 814 connected to a display 1202, a camera, a speaker, and an input device (a microphone/pointing device) via the network 818. In this case, the network 818 may be a wired network, or wireless network.

The NIC 814 of the audio processing system 800 may be configured to communicate with a manipulator, such as a robot 1206 via the network 818. The robot 1206 may include a manipulator controller 1208 and a sub-manipulator 1210 connected to a manipulator state detector 1212, in which the sub-manipulator 1210 is configured to assemble workpieces 1214 for manufacturing parts of a product or finalizing the product. Further, the NIC 814 may be connected to an object detector 1216, via the network 818. The object detector 1216 may be arranged so as to detect a state of the workpiece 1214, the sub-manipulator 1210, and the manipulator state detector 1212 connected to the manipulator controller 1208 arranged in the robot 1206. The manipulator state detector 1212 detects and transmits manipulator state signals (S) to the manipulator controller 1208. The manipulator controller 1208 then provides process flows or instructions based on the manipulator state signals (S).

The display 1202 may display the process flows or instructions representing process steps for assembling products based on a (predesigned) manufacturing method. The manufacturing method may be received via the network 818 and stored into the memory 806 or the storage device 808. For instance, when the operator 1204 checks a condition of assembled parts of a product or an assembled product (while performing a quality control process according to a format, such as process record format), an audio input may be provided via the microphone of the cooperative operation system 12000 to record the quality check. The quality check may be performed based on the product manufacturing process and product specifications that may be indicated on the display 1202. The operator 1204 may also provide instructions to the robot 1206 to perform operations for the product assembly lines. The audio processing system 800 can perform the ASR transcription task on the audio input to produce transcription the speech of the operator 1204. Alternatively, the audio processing system 800 can jointly perform the ASR and AED transcription tasks to produce transcription the speech of the operator 1204 and determine attributes such as speaker ID and gender of the operator 1204.

The cooperative operation system 1200 can store results confirmed by the operator 1204 and corresponding transcription into the memory 806 or the storage device 808 as text data using the speech-to-text program. Additionally, the cooperative operation system 1200 can store the determined attributes. Further, the results may be stored with time stamps along with item numbers assigned to each assembled part or assembled product for a manufacturing product record. Further, the cooperative operation system 1200 may transmit the records to a manufacturing central computer (not shown in FIG. 12) via the network 818, such that the whole process data of assemble lines are integrated to maintain/record of the operator and the quality of the products.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. An audio processing system, comprising:
   an input interface configured to receive an audio signal;
   a memory configured to store a neural network trained to determine different types of attributes of multiple concurrent audio events of different origins,
      wherein the different types of attributes include time-dependent and time-agnostic attributes of speech and non-speech audio events,
      wherein a model of the neural network shares at least some parameters for determining the different types of attributes,
      wherein the neural network is trained jointly to perform multiple different transcription tasks using the shared parameters for performing each of the multiple different transcription tasks,
      wherein the multiple different transcription tasks include an automatic speech recognition (ASR) transcription task, an acoustic event detection (AED) transcription task, and an audio tagging (AT) transcription task,
      wherein the model of the neural network includes a transformer model and a connectionist temporal classification (CTC)-based model, and
      wherein the transformer model includes an encoder and a decoder;
   a processor configured to:
      process the audio signal with the encoder to encode the audio signal;
      process the encoded audio signal with the decoder to execute ASR decoding, AED decoding, and AT decoding to produce a decoder output;
      process the encoded audio signal with the CTC-based model to execute the ASR decoding and the AED decoding to produce a CTC output, wherein the decoder output and the CTC output of the ASR decoding and the AED decoding are jointly scored to produce a joint decoding output; and
      process the joint decoding output and the decoder output to produce metadata of the audio signal, the metadata including one or multiple attributes of one or multiple audio events in the audio signal; and
   an output interface configured to output the metadata of the audio signal.

2. The audio processing system of claim 1, wherein the audio signal carries the multiple concurrent audio events including the speech audio event and the non-speech audio event, and wherein the processor is further configured to determine a speech attribute of the speech audio event and a non-speech attribute of the non-speech audio event using the neural network to produce the metadata.

3. The audio processing system of claim 1, wherein the audio signal carries the multiple concurrent audio events having at least one time-dependent attribute of the time-dependent attributes and at least one time-agnostic attribute of the time-agnostic attributes, wherein the at least one time-dependent attribute includes one or combination of a detection of the speech audio event, and a transcription of speech of the speech audio event, and wherein the at least one time-agnostic attribute includes tagging the audio signal with a label or with an audio caption describing an audio scene associated with the audio signal using a natural language sentence.

4. The audio processing system of claim 1, wherein the audio signal carries the multiple concurrent audio events having at least one time-dependent attribute of the time-dependent attributes and at least one time-agnostic attribute of the time-agnostic attributes, wherein the at least one time-dependent attribute includes one or combination of a transcription of speech, and a detection of a temporal position of the multiple concurrent audio events, and wherein the at least one time-agnostic attribute includes tagging the audio signal with one or more of a label or an audio caption describing an audio scene associated with the audio signal using a natural language sentence.

5. The audio processing system of claim 1, wherein the parameters shared for determining the different types of attributes include parameters of the encoder.

6. The audio processing system of claim 5, wherein the parameters shared for determining the different types of attributes include parameters of the decoder.

7. The audio processing system of claim 5, wherein the parameters shared for determining the different types of attributes include parameters of the encoder and the decoder.

8. The audio processing system of claim 5, wherein the processor is further configured to:
   process the audio signal with the encoder of the neural network to produce an encoding; and process the encoding multiple times with the decoder initialized to different states corresponding to the different types of attributes to produce different decodings of the different types of attributes of the multiple concurrent audio events.

9. The audio processing system of claim 1, wherein the CTC-based model is configured to produce temporal information for one or more of the ASR or the AED transcription task.

10. The audio processing system of claim 1,
wherein the input interface is further configured to accept an input symbol indicative of a desired transcription task of the multiple different transcription tasks; and
wherein the processor is further configured to:
switch an initial state of the decoder according to the input symbol to perform the desired transcription task using the neural network.

11. The audio processing system of claim 1, wherein the transformer model is jointly trained with the CTC-based model to perform the ASR and AED transcription tasks.

12. The audio processing system of claim 1, wherein the neural network is trained with a multi-objective cost function including a weight factor to control weighting between a transformer objective function and a CTC objective function, for performing jointly the ASR, AED, and AT transcription tasks.

13. The audio processing system of claim 12, wherein the neural network is trained using a set of ASR samples, a set of AED samples, and a set of AT samples.

14. The audio processing system of claim 1, wherein the audio signal includes the multiple concurrent audio events associated with multiple audio sources, and wherein the processor is further configured to:
determine, using the neural network, at least one attribute of at least one audio event of the multiple audio sources;
compare the at least one attribute of the at least one audio event with a predetermined at least one attribute of the at least one audio event; and
determine anomaly in the multiple audio sources based on a result of the comparison.

15. An audio processing method, comprising:
accepting an audio signal via an input interface;
determining, via a neural network, different types of attributes of multiple concurrent audio events of different origins in the audio signal,
wherein the different types of attributes include time-dependent and time-agnostic attributes of speech and non-speech audio events,
wherein a model of the neural network shares at least some parameters for determining the different types of attributes,
wherein the neural network is trained jointly to perform the multiple different transcription tasks using the shared parameters for performing each of the multiple different transcription tasks,
wherein the multiple different transcription tasks include an automatic speech recognition (ASR) transcription task, an acoustic event detection (AED) transcription task, and an audio tagging (AT) transcription task,
wherein the model of the neural network includes a transformer model and a connectionist temporal classification (CTC)-based model, and
wherein the transformer model includes an encoder and a decoder;
processing, via the processor, the audio signal with the encoder to encode the audio signal;
processing, via the processor, the encoded audio signal with the decoder to execute ASR decoding, AED decoding, and AT decoding to produce a decoder output;
processing, via the processor, the encoded audio signal with the CTC-based model to execute the ASR decoding and the AED decoding to produce a CTC output, wherein the decoder output and the CTC output of the ASR decoding and the AED decoding are jointly scored to produce a joint decoding output;
processing, via the processor, the joint decoding output and the decoder output to produce metadata of the audio signal, the metadata including one or multiple attributes of one or multiple audio events in the audio signal; and
outputting, via an output interface, the metadata of the audio signal.

16. An audio processing system, comprising:
an input interface configured to receive an audio signal;
a memory configured to store a neural network trained to determine different types of attributes of multiple concurrent audio events of different origins,
wherein the different types of attributes include time-dependent and time-agnostic attributes of speech and non-speech audio events,
wherein a model of the neural network shares at least some parameters to determine the different types of attributes
wherein the shared parameters correspond to weights of the neural network, and
wherein the neural network is trained jointly, based on reuse of the weights of the neural network, to perform multiple different transcription tasks;
a processor configured to: process the audio signal with the neural network to produce metadata of the audio signal, the metadata including one or multiple attributes of one or multiple audio events in the audio signal; and
an output interface configured to output the metadata of the audio signal,
wherein the multiple different transcription tasks include an automatic speech recognition (ASR) transcription task and an acoustic event detection (AED) transcription task, and
wherein the model of neural network includes a transformer model and a connectionist temporal classification (CTC) based model, wherein the transformer model includes an encoder configured to encode the audio signal and a decoder configured to execute ASR decoding and AED decoding to produce a decoder output for the encoded audio signal, wherein the CTC-based model is configured to execute the ASR decoding and the AED decoding, for the encoded audio signal, to produce a CTC output for the encoded audio signal, and wherein the decoder output and the CTC output of the ASR decoding and the AED decoding are jointly scored to perform the ASR transcription task and the AED transcription task jointly.

17. The audio processing system of claim 16, wherein the different types of attributes include time-dependent and time-agnostic attributes of speech and non-speech audio events.

18. The audio processing system of claim 16,
wherein the metadata includes one or multiple attributes of one or multiple audio events in the audio signal.

19. The audio processing system of claim 16, wherein the multiple different transcription tasks include one or more of an automatic speech recognition (ASR) transcription task, an acoustic event detection (AED) transcription task, and an audio tagging (AT) transcription task.

\* \* \* \* \*